US009900742B1

(12) United States Patent
Thoresen et al.

(10) Patent No.: US 9,900,742 B1
(45) Date of Patent: Feb. 20, 2018

(54) WIRELESS DEVICE DETECTION, TRACKING, AND AUTHENTICATION PLATFORM AND TECHNIQUES

(71) Applicant: SCRRD, Inc., Seattle, WA (US)

(72) Inventors: Lucas Thoresen, Minneapolis, MN (US); Joshua Cohen, Seattle, WA (US)

(73) Assignee: SCRRD, Inc., Seattle, WA (US)

( * ) Notice: Subject to any disclaimer, the term of this patent is extended or adjusted under 35 U.S.C. 154(b) by 0 days.

(21) Appl. No.: 15/599,436

(22) Filed: May 18, 2017

Related U.S. Application Data

(60) Provisional application No. 62/473,172, filed on Mar. 17, 2017.

(51) Int. Cl.

| | |
|---|---|
| *H04W 4/02* | (2009.01) |
| *G01S 13/46* | (2006.01) |
| *H04W 8/00* | (2009.01) |
| *H04W 4/00* | (2018.01) |
| *H04W 8/24* | (2009.01) |
| *H04W 12/06* | (2009.01) |
| *H04W 84/12* | (2009.01) |

(52) U.S. Cl.
CPC ............. *H04W 4/021* (2013.01); *G01S 13/46* (2013.01); *H04W 4/008* (2013.01); *H04W 4/023* (2013.01); *H04W 8/005* (2013.01); *H04W 8/24* (2013.01); *H04W 12/06* (2013.01); *G01S 2013/466* (2013.01); *H04W 84/12* (2013.01)

(58) Field of Classification Search
CPC .......... H04W 4/02; H04W 4/021; G01S 13/46
USPC .......................................... 455/456.1, 456.5
See application file for complete search history.

(56) References Cited

U.S. PATENT DOCUMENTS

| | | |
|---|---|---|
| 6,553,236 B1 | 4/2003 | Dunko et al. |
| 6,975,873 B1 | 12/2005 | Banks et al. |

(Continued)

FOREIGN PATENT DOCUMENTS

WO  WO 2016109455  7/2016

OTHER PUBLICATIONS

"802.11 Framing in Detail," 47 Pages, Can be retrieved at <URL:http://osnet.cs.nchu.edu.tw/powpoint/seminar/802.11/802.11Framing%20in%20Detail.pdf>, date unknown.

(Continued)

*Primary Examiner* — Christopher M Brandt
(74) *Attorney, Agent, or Firm* — Fenwick & West LLP

(57) ABSTRACT

Methods, systems, and techniques for wireless device detection, information, tracking, and authentication within a platform are provided. Example embodiments provide a Wireless Device Detection, Tracking, and Authentication System and methods, which enables users to detect wireless devices, obtain stored information about wireless devices, and authenticate wireless devices for a variety of purposes including determining similarity of devices based upon prior network connections, pinpointing the location of the device, verifying the cryptographic signature of the device, obtaining metadata associated with the device, and controlling the device to perform a particular action such as alerts and notifications. An example WDDTAS platform includes a server, one or more edge sensors communicatively connected to wireless/wired devices with or without software to configure the device to perform as an electronic tag and connected to electronic smart tags, and a persistent data repository.

29 Claims, 17 Drawing Sheets

(56) References Cited

U.S. PATENT DOCUMENTS

| | | |
|---|---|---|
| 7,006,838 B2 | 2/2006 | Diener et al. |
| 7,120,455 B1 | 10/2006 | Chen et al. |
| 7,151,764 B1 | 12/2006 | Heinonen et al. |
| 7,209,755 B2 | 4/2007 | Gorday et al. |
| 7,236,128 B2 | 6/2007 | Sugar et al. |
| 7,239,871 B2 | 7/2007 | Shamp et al. |
| 7,286,833 B2 | 10/2007 | Friday et al. |
| 7,359,724 B2 | 4/2008 | Torvinen |
| 7,370,362 B2 | 5/2008 | Olson et al. |
| 7,444,145 B2 | 10/2008 | Diener |
| 7,447,508 B1 | 11/2008 | Tendler |
| 7,456,596 B2 | 11/2008 | Goodall et al. |
| 7,457,634 B2 | 11/2008 | Morinaga et al. |
| 7,760,654 B2 | 7/2010 | Adya et al. |
| 7,823,199 B1 | 10/2010 | Rathi et al. |
| 7,835,754 B2 | 11/2010 | Alizadeh-Shabdiz et al. |
| 7,924,785 B2 | 4/2011 | Shaheen et al. |
| 8,014,788 B2 | 9/2011 | Alizadeh-Shabdiz et al. |
| 8,031,657 B2 | 10/2011 | Jones et al. |
| 8,086,227 B2 | 12/2011 | Adya et al. |
| 8,086,232 B2 | 12/2011 | Krishnan |
| 8,090,386 B2 | 1/2012 | Alizadeh-Shabdiz et al. |
| 8,103,288 B2 | 1/2012 | Alizadeh-Shabdiz et al. |
| 8,140,094 B2 | 3/2012 | Morgan et al. |
| 8,145,182 B2 | 3/2012 | Rudolf et al. |
| 8,244,272 B2 | 8/2012 | Morgan et al. |
| 8,265,657 B2 | 9/2012 | Shao et al. |
| 8,314,736 B2 | 11/2012 | Moshfeghi |
| 8,320,931 B2 | 11/2012 | Ward et al. |
| 8,352,639 B2 | 1/2013 | Dods et al. |
| 8,369,264 B2 | 2/2013 | Brachet et al. |
| 8,373,562 B1 | 2/2013 | Heinze et al. |
| 8,400,268 B1 | 3/2013 | Malik et al. |
| 8,421,615 B2 * | 4/2013 | Ryu ............... G08C 21/00 340/10.1 |
| 8,457,657 B2 | 6/2013 | Aggarwal et al. |
| 8,477,731 B2 | 7/2013 | Nanda et al. |
| 8,478,297 B2 | 7/2013 | Morgan et al. |
| 8,483,704 B2 | 7/2013 | Nanda et al. |
| 8,504,057 B2 | 8/2013 | Choi et al. |
| 8,526,967 B2 | 9/2013 | Alizadeh-Shabdiz et al. |
| 8,536,999 B2 | 9/2013 | Holcman et al. |
| 8,538,453 B2 | 9/2013 | Choi et al. |
| 8,538,457 B2 | 9/2013 | Morgan et al. |
| 8,630,664 B2 | 1/2014 | Alizadeh-Shabdiz et al. |
| 8,674,806 B1 | 3/2014 | Malik et al. |
| 8,700,064 B2 | 4/2014 | Shao et al. |
| 8,725,777 B2 * | 5/2014 | Deking ............ G06F 17/30879 707/803 |
| 8,787,171 B2 | 7/2014 | Macnaughtan et al. |
| 8,798,008 B2 | 8/2014 | Nanda et al. |
| 8,805,360 B2 | 8/2014 | Nagaraj |
| 8,806,027 B2 | 8/2014 | Abanami et al. |
| 8,812,013 B2 | 8/2014 | Agarwal et al. |
| 8,837,363 B2 | 9/2014 | Jones et al. |
| 8,880,103 B2 | 11/2014 | Gupta et al. |
| 8,897,814 B2 | 11/2014 | Gupta et al. |
| 8,909,245 B2 | 12/2014 | Alizadeh-Shabdiz et al. |
| 8,923,144 B2 | 12/2014 | Shao et al. |
| 8,938,211 B2 | 1/2015 | Das et al. |
| 8,965,412 B2 | 2/2015 | Alizadeh-Shabdiz et al. |
| 8,982,785 B2 | 3/2015 | Pandey et al. |
| 8,983,493 B2 | 3/2015 | Brachet et al. |
| 8,989,053 B1 * | 3/2015 | Skaaksrud ........... H04W 12/06 370/255 |
| 9,003,488 B2 | 4/2015 | Spencer et al. |
| 9,008,690 B2 | 4/2015 | Alizadeh-Shabdiz et al. |
| 9,037,162 B2 | 5/2015 | Morgan et al. |
| 9,060,380 B2 | 6/2015 | Nanda et al. |
| 9,071,603 B1 | 6/2015 | Frederick et al. |
| 9,103,900 B2 | 8/2015 | Alizadeh-Shabdiz |
| 9,143,883 B2 | 9/2015 | Han et al. |
| 9,143,899 B2 | 9/2015 | Gupta et al. |
| 9,167,381 B2 | 10/2015 | McDonald et al. |
| 9,173,187 B2 | 10/2015 | Moshfeghi |
| 9,203,840 B2 | 12/2015 | Spencer et al. |
| 9,234,958 B2 | 1/2016 | Syrjarinne et al. |
| 9,234,965 B2 | 1/2016 | Venkatraman |
| 9,253,596 B2 | 2/2016 | Sridhara et al. |
| 9,279,877 B2 | 3/2016 | Alizadeh-Shabdiz |
| 9,319,968 B2 | 4/2016 | Montemurro et al. |
| 9,357,478 B2 | 5/2016 | Nagaraj |
| 9,369,884 B2 | 6/2016 | Jones et al. |
| 9,380,501 B2 | 6/2016 | Shaheen et al. |
| 9,392,407 B2 | 7/2016 | Brachet et al. |
| 9,398,412 B2 | 7/2016 | Prechner et al. |
| 9,398,558 B2 | 7/2016 | Morgan et al. |
| 9,426,613 B2 | 8/2016 | Alizadeh-Shabdiz et al. |
| 9,426,724 B2 | 8/2016 | Parron et al. |
| 9,451,418 B2 | 9/2016 | Joseph et al. |
| 9,491,007 B2 | 11/2016 | Black et al. |
| 9,503,968 B2 | 11/2016 | Nathanson et al. |
| 9,535,153 B2 | 1/2017 | Gonia et al. |
| 9,538,441 B2 | 1/2017 | Meredith et al. |
| 9,544,872 B2 | 1/2017 | Wu et al. |
| 9,549,290 B2 | 1/2017 | Smith |
| 9,554,247 B2 | 1/2017 | Jones et al. |
| 9,565,526 B2 | 2/2017 | Ali et al. |
| 9,578,459 B2 | 2/2017 | Do et al. |
| 9,584,471 B2 | 2/2017 | Raman et al. |
| 9,584,968 B2 | 2/2017 | Barrand et al. |
| 9,641,964 B2 * | 5/2017 | Kulkarni ............... H04W 4/008 |
| 9,642,003 B2 | 5/2017 | Raman et al. |
| 9,642,167 B1 | 5/2017 | Snyder et al. |
| 2002/0019829 A1 | 2/2002 | Shapiro |
| 2002/0111173 A1 | 8/2002 | Hendrey et al. |
| 2002/0164995 A1 | 11/2002 | Brown et al. |
| 2002/0183072 A1 | 12/2002 | Steinbach et al. |
| 2003/0003933 A1 | 1/2003 | Deshpande et al. |
| 2003/0020623 A1 | 1/2003 | Cao et al. |
| 2003/0083046 A1 | 5/2003 | Mathis |
| 2003/0096621 A1 | 5/2003 | Jana et al. |
| 2003/0096628 A1 | 5/2003 | Bar-On et al. |
| 2003/0100326 A1 | 5/2003 | Grube et al. |
| 2003/0186716 A1 | 10/2003 | Dorenbosch et al. |
| 2004/0111184 A1 | 6/2004 | Chiappetta et al. |
| 2004/0235568 A1 | 11/2004 | Kim |
| 2004/0252837 A1 | 12/2004 | Harvey et al. |
| 2005/0113123 A1 | 5/2005 | Torvinen |
| 2005/0149443 A1 | 7/2005 | Torvinen |
| 2005/0197136 A1 | 9/2005 | Friday et al. |
| 2005/0210104 A1 | 9/2005 | Torvinen |
| 2005/0221812 A9 | 10/2005 | Gailey et al. |
| 2005/0233776 A1 | 10/2005 | Allen et al. |
| 2006/0018295 A1 | 1/2006 | Choi et al. |
| 2006/0030290 A1 | 2/2006 | Rudolf et al. |
| 2006/0030333 A1 | 2/2006 | Ward et al. |
| 2007/0042716 A1 | 2/2007 | Goodall et al. |
| 2009/0201850 A1 * | 8/2009 | Davis .................... G01S 5/0009 370/328 |
| 2010/0017126 A1 | 1/2010 | Holcman et al. |
| 2010/0105409 A1 | 4/2010 | Agarwal et al. |
| 2010/0189082 A1 | 7/2010 | Choi et al. |
| 2011/0161885 A1 | 6/2011 | Gonia et al. |
| 2012/0172054 A1 | 7/2012 | Waters et al. |
| 2013/0142059 A1 | 6/2013 | Di Girolamo et al. |
| 2013/0142384 A1 * | 6/2013 | Ofek .................. G06K 9/00771 382/103 |
| 2013/0167196 A1 | 6/2013 | Spencer et al. |
| 2013/0210425 A1 | 8/2013 | Nagaraj |
| 2013/0231130 A1 * | 9/2013 | Cherian ............... H04W 4/025 455/456.1 |
| 2013/0262203 A1 | 10/2013 | Frederick et al. |
| 2014/0018059 A1 | 1/2014 | Noonan |
| 2014/0079043 A1 | 3/2014 | Montemurro et al. |
| 2014/0113674 A1 | 4/2014 | Joseph et al. |
| 2014/0119279 A1 | 5/2014 | Han et al. |
| 2014/0195102 A1 | 7/2014 | Nathanson |
| 2014/0342733 A1 | 11/2014 | Nagaraj |
| 2014/0355592 A1 | 12/2014 | Camps et al. |
| 2015/0051993 A1 | 2/2015 | Moshfeghi |
| 2015/0088624 A1 | 3/2015 | Frederick et al. |
| 2015/0105098 A1 | 4/2015 | Sridhara et al. |
| 2015/0235052 A1 | 8/2015 | Yoon et al. |

(56) References Cited

U.S. PATENT DOCUMENTS

| | | | |
|---|---|---|---|
| 2015/0235161 | A1 | 8/2015 | Azar et al. |
| 2015/0244721 | A1 | 8/2015 | Spencer et al. |
| 2015/0319681 | A1 | 11/2015 | Nathanson et al. |
| 2015/0319687 | A1 | 11/2015 | Farley et al. |
| 2015/0334768 | A1* | 11/2015 | Ranasinghe .......... H04W 24/10 370/328 |
| 2015/0341747 | A1 | 11/2015 | Barrand et al. |
| 2015/0373692 | A1 | 12/2015 | Jern et al. |
| 2016/0050559 | A1 | 2/2016 | Rose et al. |
| 2016/0066252 | A1 | 3/2016 | Parron et al. |
| 2016/0069983 | A1 | 3/2016 | Gonia et al. |
| 2016/0073252 | A1 | 3/2016 | Spencer et al. |
| 2016/0169696 | A1 | 6/2016 | Butts et al. |
| 2016/0189416 | A1* | 6/2016 | Naguib .................... G06T 15/00 345/441 |
| 2016/0227359 | A1 | 8/2016 | Hurewitz et al. |
| 2016/0227477 | A1 | 8/2016 | Montemurro et al. |
| 2016/0227478 | A1 | 8/2016 | Montemurro et al. |
| 2016/0269858 | A1 | 9/2016 | Nagaraj |
| 2016/0360362 | A1 | 12/2016 | Do et al. |
| 2016/0377697 | A1 | 12/2016 | Sella |
| 2017/0006430 | A1* | 1/2017 | Chao ..................... H04W 4/021 |
| 2017/0012935 | A1 | 1/2017 | Raman et al. |
| 2017/0013445 | A1 | 1/2017 | Raman et al. |
| 2017/0013447 | A1 | 1/2017 | Raman et al. |
| 2017/0013448 | A1 | 1/2017 | Raman et al. |
| 2017/0013449 | A1 | 1/2017 | Raman et al. |
| 2017/0018184 | A1 | 1/2017 | Northrup et al. |
| 2017/0026805 | A1 | 1/2017 | Smith et al. |
| 2017/0034692 | A1 | 2/2017 | Spencer et al. |
| 2017/0034774 | A1 | 2/2017 | Nathanson et al. |
| 2017/0078840 | A1 | 3/2017 | Saurav et al. |
| 2017/0086024 | A1 | 3/2017 | Do |
| 2017/0089739 | A1* | 3/2017 | Gallo ..................... G08B 21/18 |
| 2017/0188066 | A1* | 6/2017 | Gaidar ................. H04N 21/252 |

OTHER PUBLICATIONS

Apple, Inc., "iBeacon Insider," 4 Pages, [Archived on web.archive.org on Oct. 19, 2016] Can be retrieved at <URL: https://web.archive.org/web/20161019170422/http://www.ibeacon.com/what-is-ibeacon-a-guide-to-beacons/>.

Created by Unknown User (farrah) "TULIP Algorithm Alternative Trilateration Method," dated May 31, 2010, 3 pages, Can be retrieved at <URL:https://confluence.slac.stanford.edu/display/IEPM/TULIP+Algorithm+Alternative+Trilateration+Method>.

Danova, T., "BEACONS: What They Are, How They Work, and Why Apple's iBeacon Technology is Ahead of the Pack," Business Insider, dated Oct. 23, 2014, 4 Pages. Can be retrieved at <http://www.businessinsider.com/beacons-and-ibeacons-create-a-new-market-2013-12>.

Find, "FAQ" website copyright date 2016, pp. 1-8, Can be retrieved at <URL:https://www.internalpositioning.com/faq/#how-does-it-work>.

Find, "Plugins," website copyright date 2016, pp. 1-6, Can be retrieved at <URL:https://www.internalpositioning.com/plugins/#using-find-without-an-app>.

Freudiger, J., "Short: How Talkative is your Mobile Device" An Experimental Study of Wi-Fi Probe Requests, PARC, dated Jun. 22, 2015, ACM, pp. 1-6, Can be retrieved at <URL:https://frdgr.ch/wp-content/uploads/2015/06/Freudiger15.pdf>.

Gast, M., "802.11 Wireless Networks," The Definitive Guide, 2nd Edition, 2005, O'Reilly Media, Inc., pp. 94-114.

Geier, J., "Understanding 802.11 Frame Types," Wi-Fi Planet, dated Aug. 15, 2002, 3 Pages, Can be retrieved at <URL:http://www.wi-fiplanet.com/tutorials/article.php/1447501/Understanding-80211-Frame-Types.htm>.

GITHUB, Inc., "Hoover," dated Jun. 9, 2015, 4 Pages. Can be retrieved at <https://github.com/xme/hoover/blob/master/hoover.pl>.

Ibrahim, M., "CellSense: An Accurate Energy-Efficient GSM Positioning System," IEEE Transactions on Vehicular Technology, vol. 61, Issue: 1, Jan. 2012, pp. 1-11.

Mertens, X., "Show me your SSID's, I'll Tell Who You Are!," TrueSec, dated Jan. 12, 2012, 22 pages, Can be retrieved at <URL:https://blog.rootshell.be/2012/01/12/show-me-your-ssids-ill-tell-who-you-are/>.

Microsoft, "How 802.11 Wireless Works," dated Mar. 28, 2003, 17 Pages. Can be retrieved at <https://technet.microsoft.com/en-us/library/cc757419(v=ws.10).aspx>.

Mitchell, B., "Wireless Standards 802.11a, 802.11b/g/n, and 802.11ac," The 802.11 Family Explained, Lifewire, About, Inc., dated Feb. 23, 2017, 3 Pages, Can be retrieved at <URL:https://www.lifewire.com/wireless-standards-802-11a-802-11b-g-n-and-802-11ac-816553>.

Neilson, B., "Demystifying the 802.11 Protocol," 2009, 48 Pages, Can be retrieved at <URL:https://www.cs.umd.edu/class/fall2009/cmsc417/Slides/KC711B_-_Demystifying_the_802_11_Protocol.pdf>.

Paganini, P., "How to discover NSA Quantum Insert attacks on your systems," Security Affairs, dated Apr. 23, 2015, 6 Pages, Can be retrieved at <URL:http://securityaffairs.co/wordpress/36224/hacking/nsa-quantum-insert-attacks.html>.

Parthipattu, S., "802.11 Sniffer Capture Analysis—Management Frames and Open Auth," Cisco Support Community, dated May 25, 2012, 18 Pages, Can be retrieved at <URL:https://supportforums.cisco.com/document/101431/80211-sniffer-capture-analysis-manage>.

Posted by Dave, "Python—What methods, other than listening for Probe Requests, can be used to find 802.11 wifi devices?" Stack Exchange, Inc., dated Oct. 17, 2010, 2 pages, Can be retrieved at <URL:https://stackoverflow.com/questions/3952252/what-methods-other-than-listening-for-probe-requests-can-be-used-to-find-802-1>.

Posted by Lennarthaagsma, "Deep dive into Quantum Insert," Fox-IT International blog, dated Apr. 20, 2015, 11 Pages, Can be retrieved at <URL:https://blog.fox-it.com/2015/04/20/deep-dive-into-quantum-insert/>.

Posted by Robin Hennings, "Capture WiFi / WLAN / 802.11 Probe Request with tcpdump," Rob'n'Roll, dated Mar. 4, 2016, 3 Pages, Can be retrieved at <URL:http://robinhenniges.com/en/capture-probe-request-tcpdump-wlan-wifi>.

Security Zap, "How to Detect NSA's Quantum Insert Attacks," dated Jun. 8, 2015, 6 Pages, Can be retrieved at <URL:https://securityzap.com/how-to-detect-nsas-quantum-insert-attacks/>.

Tourrilhes, J., "iwconfig—configure a wireless network interface," Linux Programmer's Manual, Systutorials, Source last updated Oct. 5, 2016, 8 Pages, Can be retrieved at <URL: https://manpages.debian.org/stretch/wireless-tools/iwconfig.8.en.html>.

Van Diggelen, F., et al., Abstract for "The World's first GPS MOOC and Worldwide Laboratory using Smartphones," Proceedings of the 28th International Technical Meeting of The Satellite Division of the Institute of Navigation, Sep. 14-18, 2015, ION Institute of Navigation, pp. 361-369.

Varshavsky, A., et al., "Are GSM phones the solution for localization?" Proceedings of the Seventh IEEE Workshop on Mobile Computing Systems & Applications (WMCSA'06), 2006, 6 Pages.

Webpage for gps.gov, "GPS Accuracy," National Coordination Office for Space-Based Positioning, Navigation, and Timing, Last modified on Feb. 10, 2017, 3 Pages, Can be retrieved at <URL:http://www.gps.gov/systems/gps/performance/accuracy/>.

Wikipedia, "iBeacon," dated Mar. 5, 2017, 9 Pages, Can be retrieved at <URL:https://en.wikipedia.org/w/index.php?title=IBeacon&oldid=768774290>.

Wikipedia, "IEEE 802.11," dated Mar. 5, 2017, 19 Pages, Can be Retrieved at <URL: https://en.wikipedia.org/w/index.php?title=IEEE_802.11&oldid=768766613>.

Wikipedia, "IMSI-catcher," dated Mar. 2, 2017, 5 Pages, Can be retrieved at <URL:https://en.wikipedia.org/w/index.php?title=IMSI-catcher&oldid=768174682>.

Wikipedia, "Mobile phone tracking," dated Mar. 10, 2017, 5 Pages, Can be retrieved at <URL:https://en.wikipedia.org/w/index.php?title=Mobile_phone_tracking&oldid=769550185>.

(56) References Cited

OTHER PUBLICATIONS

Wikipedia, "Multilateration," dated Feb. 21, 2017, 10 Pages, Can be retrieved at <URL: https://en.wikipedia.org/w/index.php?title=Multilateration&oldid=766692328>.
Wikipedia, "Station (networking)," dated Mar. 15, 2017, 1 Page, Can be retrieved at <URL:https://en.wikipedia.org/w/index.php?title=Station_(networking)&oldid=770431854>.
Wikipedia, "Trilateration," dated Nov. 2, 2016, 5 Pages, Can be retrieved at <URL:https://en.wikipedia.org/wiki/Trilateration>.
Zabala, V., "Sirqul, Inc. Announces First Issued IoT Patent Coordinating the Inter-connection of Multiple Devices, With and Without a Central Cloud Server," Press Release, SIRQUL, dated Jun. 30, 2015, 2 Pages, Can be retrieved at <URL:https://corp.sirqul.com/sirqul-inc-announces-first-issued-iot-patent-coordinating-the-inter-connection-of-multiple-devices-with-and-without-a-central-cloud-server/>.
Zabala, V., "Retailers Can Now Master Omni-Channel Customer Engagement with "Project Avatar", a Smart-Mesh Beacon Technology from Sirqul and Inventec," Press Release, SIRQUL, dated Mar. 31, 2016, 3 Pages, Can be retrieved at <URL: https://corp.sirqul.com/5483/>.
PCT International Search Report and Written Opinion for PCT/US17/33428, dated Aug. 1, 2017, 20 Pages.
Creepydol: Cheap Distributed Stalking Video, Aug. 9, 2013, 4 Pages, Can be retrieved at <URL:http://blog.ussjoin.com/2013/08/creepydol.html>.
Goodin, D., "DIY stalker boxes spy on Wi-Fi users cheaply and with maximum creep value," Ars Technica, Aug. 8, 2013, 6 Pages, Can be retrieved at <URL:https://arstechnica.com/information-technology/2013/08/diy-stalker-boxes-spy-on-wi-fi-users-cheaply-and-with-maximum-creep-value/>.
Ivancic, M., "Tracking Users in Wireless Computer Networks," Jan. 8, 2015, 14 Pages, Can be retrieved at URL:http://markoivancic.from.hr/tracking-users-in-wireless-computer-networks/>.
Newman, L., "Wikileaks dump reveals a Creepy CIA Location-Tracking Trick," Wired, Jun. 26, 2017, 13 Pages, Can be retrieved at <URL://https://www.wired.com/story/wikileaks-cia-wifi-location-tracking/>.
Nishi, D., "Customer Tracking Through an Affordable Consumer Device Array," A Senior Project presented to the Faculty of the Deparment of Computer Science California Polytechnic State University, San Luis Obispo, Jun. 8, 2015, 62 Pages, Can be retrieved at <URL:http://digitalcommons.calpoly.edu/cgi/viewcontent.cgi?article=1050&context=cscp>.
O'Connor, B., "Stalking a City for Fun and Frivolity," Malice Afterthought, Inc., Archived on web.archive.org on Jan. 10, 2017, 57 Pages, Can be retrieved at URL:https://web.archive.org/web/20170110075935/https://www.defcon.org/images/defcon-21/dc-21-presentations/OConnor/DEFCON-21-OConnor-Stalking-a-City-for-Fun-and-Frivolity-Updated.pdf>.
Scheuner, J., et al., "Probr—A Generic and Passive WiFi Tracking System," 2016 IEEE 41st Conference on Local Computer Networks, Nov. 2016, pp. 495-502.
Wilkinson, G., "Digital Terrestrial Tracking: The Future of Surveillance," SnesePost, DefCon22, Aug. 2014, 9 Pages, Can be retrieved at <URL://https://sensepost.com/blogstatic/2014/08/GRW_DefCon22.pdf>.

\* cited by examiner 802.11 Management Frame 802.11 Probe Request

Fig. 6B

```
∨ IEEE 802.11 Probe Request, Flags: ..........
    Type/Subtype: Probe Request (0x0004)
  > Frame Control Field: 0x4000
    .000 0000 0000 0000 = Duration: 0 microseconds
    Receiver address: Broadcast (ff:ff:ff:ff:ff:ff)
    Destination address: Broadcast (ff:ff:ff:ff:ff:ff)
    Transmitter address: LgElectr_ad:2e:75 (34:fc:ef:ad:2e:75)
    Source address: LgElectr_ad:2e:75 (34:fc:ef:ad:2e:75)
    BSS Id: Broadcast (ff:ff:ff:ff:ff:ff)
    .... .... .... 0000 = Fragment number: 0
    1101 1010 0010 .... = Sequence number: 3490
∨ IEEE 802.11 wireless LAN management frame
  ∨ Tagged parameters (116 bytes)
    > Tag: SSID parameter set: Test Network 9
    > Tag: Supported Rates 1, 2, 5.5, 11, [Mbit/sec]
    > Tag: Extended Supported Rates 6, 9, 12, 18, 24, 36, 48, 54, [Mbit/sec]
    > Tag: DS Parameter set: Current Channel: 1
    > Tag: HT Capabilities (802.11n D1.10)
    > Tag: Extended Capabilities (8 octets)
    > Tag: Vendor Specific: Broadcom
    ∨ Tag: Vendor Specific: Epigram: HT Capabilities (802.11n D1.10)
        Tag Number: Vendor Specific (221)
        Tag length: 30
        OUI: 00-90-4c (Epigram)
        Vendor Specific OUI Type: 51
        802.11n (Pre) Type: HT Capabilities (802.11n D1.10) (51)
      > HT Capabilities Info (VS): 0x112d
      > A-MPDU Parameters (VS): 0x17
      > Rx Supported Modulation and Coding Scheme Set (VS): MCS Set
      > HT Extended Capabilities (VS): 0x0000
      > Transmit Beam Forming (TxBF) Capabilities (VS): 0x00000000
      > Antenna Selection (ASEL) Capabilities (VS): 0x00
```

WIRELESS DEVICE DETECTION, TRACKING, AND AUTHENTICATION PLATFORM AND TECHNIQUES

CROSS-REFERENCE TO RELATED APPLICATION

This application claims the benefit of U.S. Provisional Patent Application No. 62/473,172, entitled "WIRELESS DEVICE DETECTION, TRACKING, AND AUTHENTICATION PLATFORM AND METHODS," filed Mar. 17, 2017; which application is incorporated herein by reference in its entirety.

TECHNICAL FIELD

The present disclosure relates to methods, techniques, and systems for detection, tracking, and authentication of wireless devices and, in particular, to methods, techniques, and systems for passively detecting, locating, authenticating, and storing information relating to wireless devices useful, for example, in security systems, financial transactions, Internet-Of-Things (IOT) Networking, inventory tracking, advertising and the like.

BACKGROUND

With the proliferation of wireless devices, especially those accessible via one or more networks, it has become essential be able to locate and identify such devices for a variety of purposes. One such categorization of purposes has been devices that contribute to a concept known as the "Internet-Of-Things" (IOT). IOT brings with it the idea that physical objects, such as devices, vehicles, buildings, and other devices, that are embedded with electronics, software, sensors, and network connectivity that enables these objects to collect and exchange data, can cooperate as a whole to enable an intelligent infrastructure. IOT allows objects to be sensed and/or controlled remotely across existing network infrastructure, creating opportunities for more direct integration of the physical world into computer-based systems, and resulting in improved efficiency, accuracy and economic benefit in addition to reduced human intervention.

Traditionally, the addressability of such devices has been based upon things like RFID-tags and identification through (electronically scan able) product codes, IP addresses and the like, which in some cases can be associated with a particular location. Locations of devices may also be determined for example using satellite based technologies, e.g., GPS, which may be independent of internet access. However, GPS technologies are currently limited to accurately locating a device within about 4.9 meters, which in some instances does not give a sufficient pinpoint location. See Diggelen et. al, *Proceedings of the 28th Int'l Technical Meeting of The Satellite Division of the Institute of Navigation*, Sep. 14-18, 2015, Tampa, Fla., Abstract. In addition, signals to satellites can be blocked such as by buildings, walls, etc. which limit the effectiveness of using GPS technologies to pinpoint locations within and near buildings. Elevation is also difficult to determine using GPS technologies.

Locations of devices may also be determined using cellular phone (cellphone) networks using the Global System for Mobile Communications (GSM) such as 2G, 3G, and 4G networks. Again, the precision of such determinations are limited by the density of cell towers (base stations) located in the area as well as the power of the signals from the cellphones. Typical precision is on the order of 50-100 meters in dense urban areas and may be much worse in rural areas where cell towers are more sparse. See Ibrahim et al., "CellSense: An Accurate Energy-Efficient GSM Positioning System," *IEEE Trans on Vehicular Technology*, Vol. 61, No. 1, pp 286-296, 2011. Several different technologies may be used including handset based (the cellphone measures its signal strength to one or more cell tower antennas) or network based methods such as comparing the relative signal strength of the cellphone when the phone is roamed from one tower to the next. In addition, some systems use SIM base measurements or combine GPS (or other Global Navigation Satellite System (GNSS)) technology with network information from a GSM system. See Wikipedia, *Mobile Phone Tracking*.

In addition, RFID tags or other technology 1-way transmitters, such as iBeacon or Beacon technology have been used to provide applications running on wireless devices such as cellphones with broadcasted tag information so that the cellphones can determine their own locations by determining their rough proximity to these tags using signal strength. The beacons (whichever technology is employed) are placed at known locations and calibrated in order for the applications on the phones to determine proximity. See ibeaconinsider, *"What is iBeacon? A Guide to Beacons,"* http://www.ibeacon.com/what-is-ibeacon-a-guide-to-beacons, 1995. Beacon technology can be used as an indoor positioning system, unlike GPS technology. Beacon technology can range from 70 meters to up to 450 meters.

BRIEF DESCRIPTION OF THE DRAWINGS

FIGS. 6B and 6C illustrates an example capture of data from a Probe Request of a wireless station containing metadata applicable to an example Wireless Device Detection, Tracking, and Authentication System.

FIGS. 8A and 8B are examples of serialized data from a Probe Request of a wireless station containing metadata to be reported by an edge sensor to a server.

DETAILED DESCRIPTION

Figure 1:
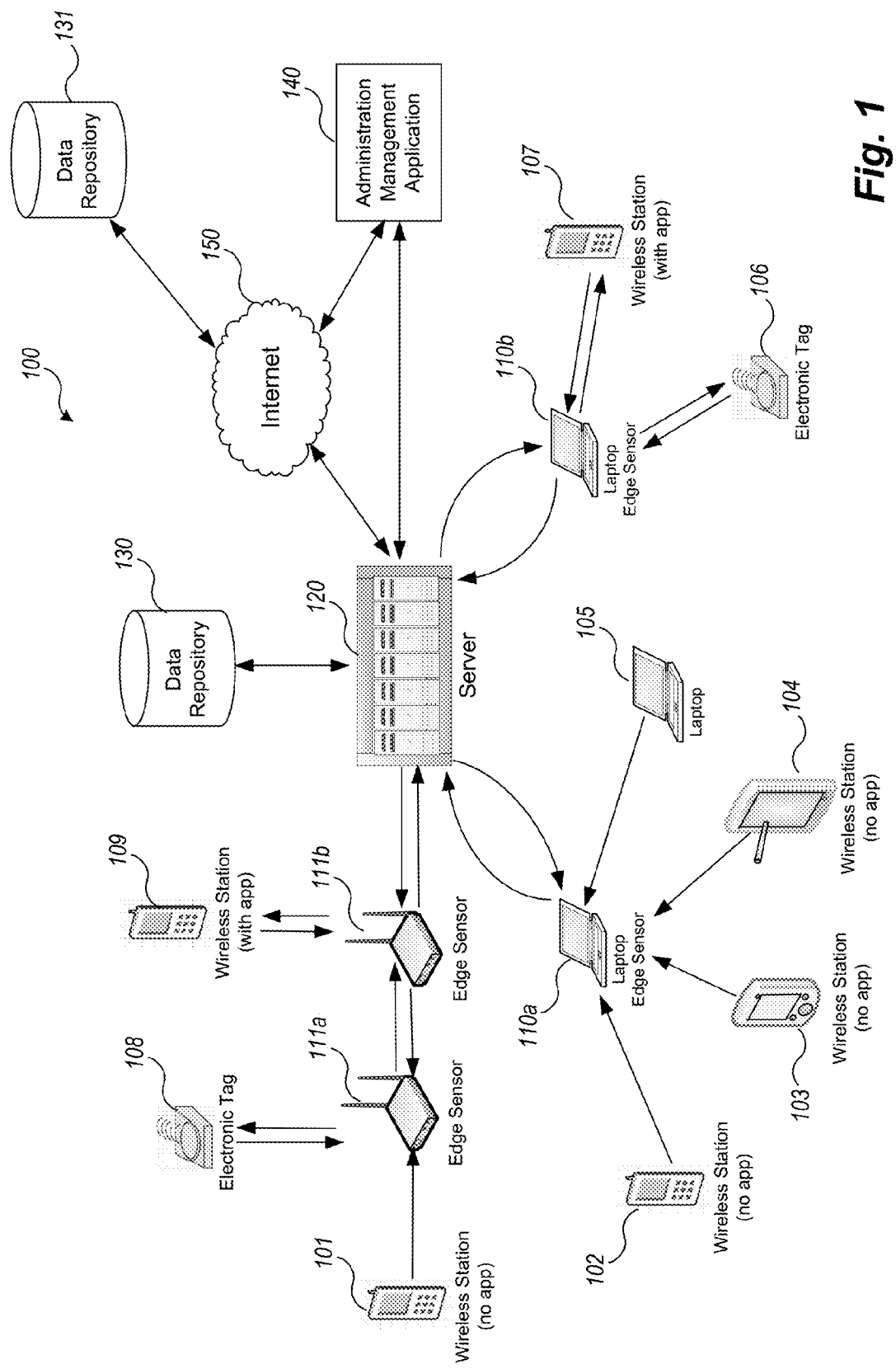
FIG. 1 is an example block diagram of components of a Wireless Device Detection, Tracking, and Authentication System (a WDDTAS) that illustrates an exemplary sensor installation.

Embodiments described herein provide enhanced computer- and network-based methods, techniques, and systems for detecting, tracking, and authenticating wireless devices. Example embodiments provide a Wireless Device Detection, Tracking, and Authentication System ("WDDTAS") and methods, which enables users to detect wireless devices, obtain stored information about wireless devices, and authenticate wireless devices for a variety of purposes including, for example:

pinpointing the location of the device whether outside or inside verifying the cryptographic signature of the device obtaining metadata associated with the device for many purposes controlling the device to perform a particular action for example purchasing or other transaction comparing expected device location with actual location facilitating the device verifying the identity of its user with a biometric or secret in addition to locating the device The Wireless Device Detection, Tracking, and Authentication System, techniques, and methods (referred to as well as the WDDTAS) allow for the tracking of WiFi or Bluetooth or other types of wireless enabled devices without requiring those devices to run an application, opt-in to being discoverable or tracked, without requiring use of a GPS (or other GNSS technology), without requiring connection to a GSM network such as 2G, 3G, 4G, and the like, and without using a SIM card, without scanning a QR code, and without requiring a user to engage in or initiate any interaction with the WDDTAS system. Accordingly, the WDDTAS enables locating, tracking, and identification of wireless devices using a passive approach.

It also provides multiple points of identity for those devices that are not running an application by comparing each device's wireless connection history and device capabilities (factors, aspects, characteristics, and the like) in order to build a device profile for each device. In certain scenarios, the device profile may identify the device or the user by anonymizing the information, thus allowing compliance with privacy laws in certain countries and with certain organizations (such as HIIPA, the Health Insurance Portability and Accountability Act of 1996). For example, the system might sense multiple devices owned by two people who have met at a particular location, (e.g. a WiFi Cafe) and can flag those devices as related because the location is one-hop away from either device. The owner of this system could set an alert when anyone who has previously connected to a particular wireless network enters the area.

Example Wireless Device Detection, Tracking, and Authentication Systems and methods can also operate with devices that are executing a WDDTAS client application in order to provide enhanced operation such as turning such devices into electronic tags, providing additional support for retail and other transactions, and the like.

Example Wireless Device Detection, Tracking, and Authentication Systems provide a sensor platform of "edge sensors" that allows for the collection, storage, analysis, and sharing of wireless signals intelligence. This includes pinpointing and verifying the signatures of mobile wireless devices by collecting the actual wireless frames (e.g., 802.11 and Bluetooth) that these devices emit. Inter-networked edge sensors pass the information between one another in order to distribute the information to a desired destination such as the server to be stored or to another inter-networked device. Important metadata and computed information, such as location or cryptographic signature, are persisted within the WDDTAS to be used for tracking and authentication. In some example WDDTASs, derived information such as using machine learning tools can be used for other activities or events.

Many different kinds of users may interact with the system having diverse needs, and thus, collected data is managed within a domain consisting of users, groups, and remote access endpoints (through an Application Programming Interface—"API"). By arranging the sensor platform within or around an area, an operator of the system can use the installation to accomplish any number of tasks involving authentication and/or locating of devices within that area.

For example, some entities may be interested in this system for operational security, that is, to place sensors all around their property and configure the system to generate alerts when unknown devices are approaching the area. Mobile devices are now prevalent and it makes sense to target these devices for authentication, advertising, surveillance, and to provide many types of service to them.

FIG. 1 is an example block diagram of components of a Wireless Device Detection, Tracking, and Authentication System (a WDDTAS) that illustrates an exemplary sensor installation. In one example embodiment, the WDDTAS installation (or topology) comprises one or more functional components/modules that work together to provide detection (including locating), tracking, and authentication of wireless devices. Wireless Device Detection, Tracking, and Authentication System 100 comprises an edge sensor platform of one or more edge sensors, e.g., edge sensors 110*a-b* and 111*a-b*, one or more servers such as server 120, one or more data repositories such as repositories 130 and 131, and one or more administrative applications such as application 140. In addition, remote endpoints into the system via API (not shown) are accessible to clients (client applications) that desire to obtain data from the system, push information to wireless devices detected by the system, and the like. A WDDTAS installation may not be fixed—it may migrate based upon various parameters and the area it covers may not be defined by fixed coordinates such as within a building or area. For example, when the sensors are in or attached to moving objects, they can define a dynamic geolocation zone for the detection of wireless devices.

The edge sensors, e.g., edge sensors 110*a-b* and 111*a-b*, are responsible for monitoring wireless devices connected to the WDDTAS platform and reporting data to the servers (e.g., server 120) to be processed and potentially persisted to the one or more data repositories. The edge sensors may also communicate with each other. When working with WiFi (802.11 protocol), each edge sensor is set to monitor mode to monitor traffic and obtain information from wireless devices within the detectable vicinity of the edge sensor. These wireless devices are referred to under the 802.11 Specification as stations (or STA). Some of these devices may have a WDDTAS client application installed and others may not. For example, edge sensor 110*a*, a laptop, may monitor wireless frame information from stations 102-105, which do not have the WDDTAS client application installed or executing. Similarly edge sensor 111*a*, a WDDTAS hardware network device, may be communicatively connected to edge sensor 111*b* (another WDDTAS hardware network device) and may monitor information from wireless stations 101 and 108. As shown, station 101 is not running the WDDTAS application, yet station 108 is (and show bidirectional communication). Edge sensor 111*b* may be communicatively connected to edge sensor 111*a* and may monitor traffic from wireless station 109 running the WDDTAS client application. Edge sensor 110*b* may monitor information from stations 106 and 107, both running the WDDTAS client application. Edge sensor functions are described further with respect to FIGS. 3-8B.

In other example WDDTAS installations (not shown), edge sensors may monitor traffic according to other wireless protocols such as Bluetooth (BT). The examples described with reference to WiFi (802.11) are relevant to BT although different mechanisms for monitoring traffic and the layout of the information varies.

The edge sensors communicate (e.g., report, transfer, forward, send, etc.) data to the one or more servers that are part of a WDDTAS installation. For example, server 120 is communicatively connected to edge sensors 111*a-b* and 110*a-b* via wired or wireless connections. The server 120 may be also communicatively connected via wired or wireless connections, directly or indirectly, to one or more data repositories, such as repositories 130 and 131. In some installations, the server 120 may be communicatively connected through a network, such as internet 150, to one or more data repositories. The one or more servers, such as server 120, is responsible for caching or storing the data reported by the edge sensors, providing security support for receiving the reported data and for interacting with other clients to the WDDTAS, post processing of the reported station metadata to determine information such as a profile of device, API support for remote endpoints into WDDTAS installation, and event management including location based (e.g., surveillance) and non-location based (e.g., retail and payment transaction support). WDDTAS server functions are described further with respect to FIGS. 9-10.

In example WDDTAS installations, one or more administrative management applications, such as administrative management application 140, are communicatively connected to the one or more servers (directly or via a network such as network 150) in order to control various aspects of the edge sensors such as configuration and maintenance, access to them and the data, and the like. For example, WDDTAS administrative application may manage the uploading and access to floor plans for aiding in user interfaces that show or track the location of wireless stations precisely. In addition, they provide support for defining and managing geofencing zones, event and notification support to other applications, report generation, and the like. WDDTAS administrative application functions are described further with respect to FIG. 13.

The data repositories, such as repositories 130 and 131, accessed by the one or more servers may comprise any form for storing data persistently or temporarily depending upon the use of the WDDTAS. For example, they may be databases, files, file servers, etc. stored in memory. The data stored in the data repositories 130 and 131 can be made accessible to third parties through an API, and access managed by an WDDTAS administrative management application such as application 140.

Figure 2:
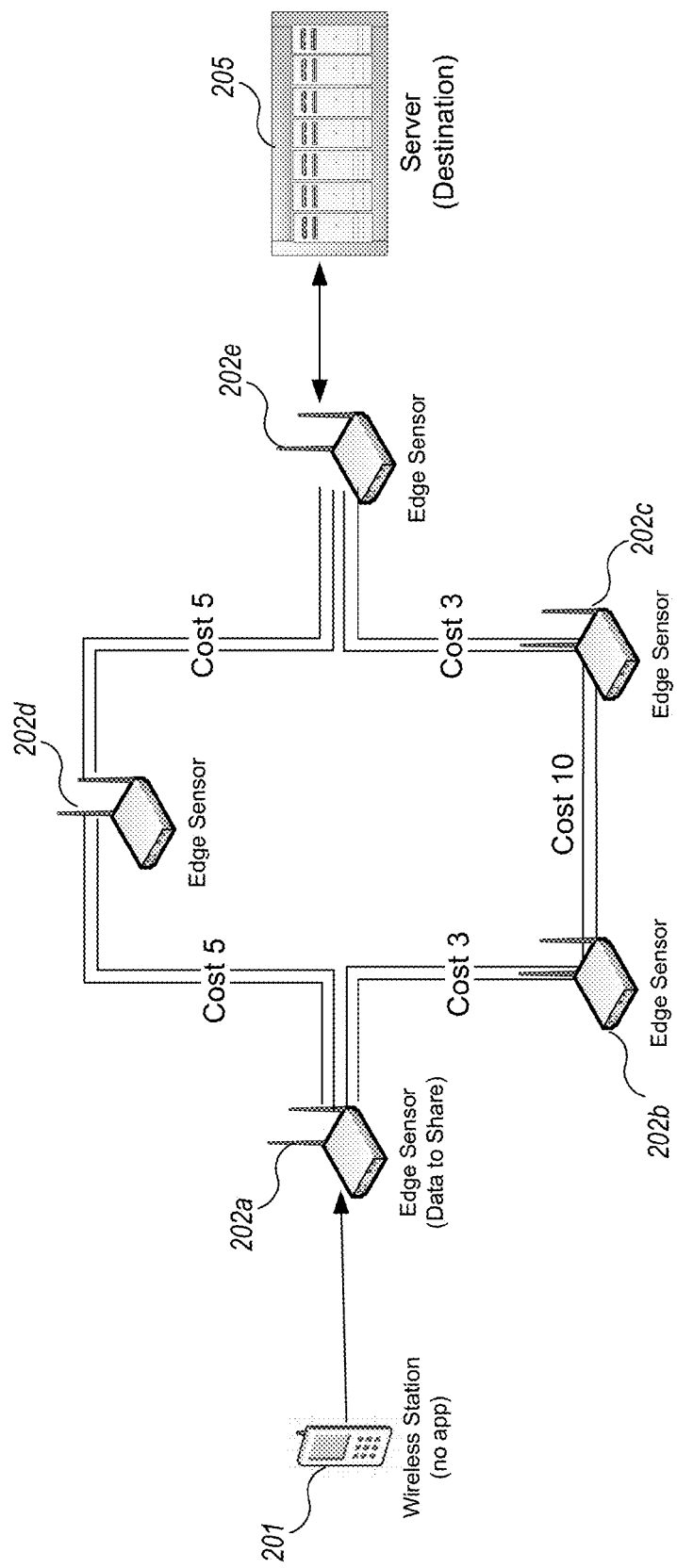
FIG. 2 depicts the path cost analysis used to determine the most efficient way to relay data to where the data is needed within a Wireless Device Detection, Tracking, and Authentication System.

As mentioned, a WDDTAS installation may not be fixed and may provide dynamic geofencing. In addition, edge sensors, such as edge sensors 110*a-b* and 111*a-b* may sometimes go offline or become unavailable for other reasons such as when wireless devices move out of range of one another. Generally, the edge sensors of a WDDTAS installation route and report information via the shortest channel to the intended destination. FIG. 2 depicts the path cost analysis used to determine the most efficient way to relay data to where the data is needed within a Wireless Device Detection, Tracking, and Authentication System. Known path cost analysis (for example using a routing metric or "link cost") may be incorporated to determine, for example, the least costly path based for example on the speed of the connection (cost may refer to time). For example, in FIG. 2, the cost of sending data from edge sensor 202*a* to edge sensor 202*e* via edge sensor 202*d* (a first path) is "10" whereas the cost of sending the same data via edge sensors 202*b* and 202*c* (a second path) is "3"+"1"+"3"="16" which is greater. (Here the numbers refer to a measurement used by the path cost analysis algorithm.) Thus, the WDDTAS installation would prefer to send the data via the first path. Other example WDDTAS installations may prefer in some instances to use the high path cost.

Although the examples described herein often refer to a mobile device, the techniques described herein can also be used by to track, locate, identify, and authenticate any type of wireless device including mobile and non-mobile devices, such as desktops, embedded wireless systems, wireless SOC devices, and the like. Essentially, the concepts and techniques described are applicable to any wireless environment where locating, tracking, authenticating, and or event processing can be used.

Although certain terms are used primarily herein, other terms could be used interchangeably to yield equivalent embodiments and examples. In addition, terms may have alternate spellings which may or may not be explicitly mentioned, and all such variations of terms are intended to be included.

Example embodiments described herein provide applications, tools, data structures and other support to implement a Wireless Device Detection, Tracking, and Authentication System and methods to be used to detect wireless devices, obtain stored information about wireless devices, and authenticate wireless devices for a variety of purposes. Other embodiments of the described techniques may be used for other purposes. In the following description, numerous specific details are set forth, such as data formats and code sequences, etc., in order to provide a thorough understanding of the described techniques. The embodiments and examples described also can be practiced without some of the specific details described herein, or with other specific details, such as changes with respect to the ordering of the logic, different logic, etc. Thus, the scope of the techniques and/or functions described is not limited by the particular order, selection, or decomposition of aspects described with reference to any particular routine, module, component, and the like.

As described above with reference to FIG. 1, WDDTAS edge sensors (passively) monitor traffic from wireless devices and communicate with other edge sensors, WDDTAS servers, wireless devices programmed to interact with edge sensors, or electronic tags (including wireless devices programmed to operate as electronic tags).

Figure 3:
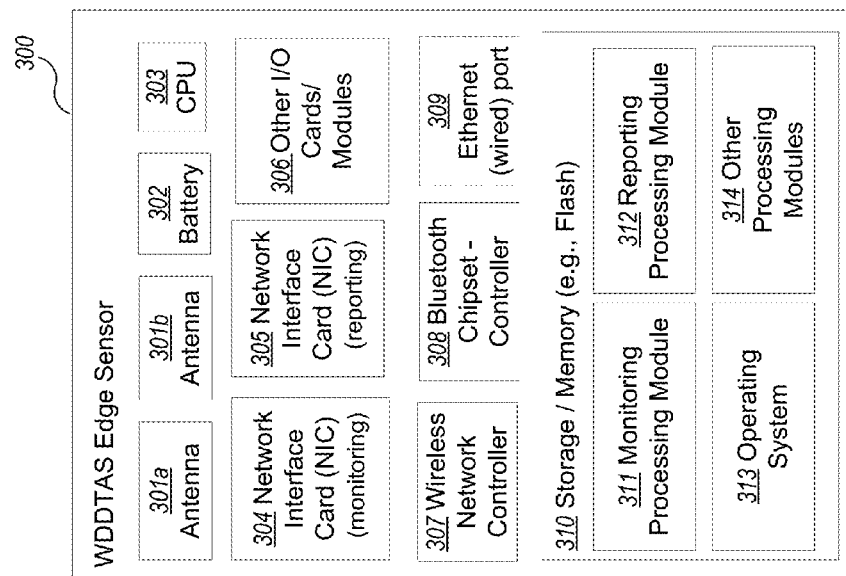
FIG. 3 is an example block diagram of components of an edge sensor in an example embodiment of a Wireless Device Detection, Tracking, and Authentication System.

FIG. 3 is an example block diagram of components of an edge sensor in an example embodiment of a Wireless Device Detection, Tracking, and Authentication System. For example, edge sensor 300 depicted therein may be one of the edge sensors 111a or 111b of FIG. 1. The components displayed may be present in a general or special purpose computer such as that described with reference to FIG. 14 and thus other components not shown (such as other input/output, I/O, devices) may be present in edge sensor 300.

Edge sensors are typically transceiver-bearing wireless computers. Transceivers comprise hardware that allows for unidirectional, bidirectional, or full-duplex communication over a wire (wired), or over the air (wireless). For example, edge sensor 300 illustrated comprises one or more wireless antennas 301a and 301b, network interface cards (or adapters) 304 and 305, other I/O cards or modules 306, battery 302 or other AC power source, a wireless network controller 307 (if not part of the NIC), a Bluetooth (BT) chipset/controller, (optionally) an Ethernet (wired network) port 309, and storage/memory 310. In any particular edge sensor implementation, one or more of these components may not be present. For example, if the edge sensor 300 only supports the monitoring of WiFi frames, then support for BT may not be present. Similarly, if the edge sensor 300 is only wirelessly connected to other edge sensors or servers, then a wired network port (such as Ethernet port 309) may not be present. In addition, in some example, edge sensor 300 comprises GPS hardware (not shown).

In one example edge sensor 300, the memory 310 is flash memory containing code logic for monitoring and reporting WiFi traffic, such as in monitoring processing module 311 and reporting processing module 312, an operating system 313 such as a Linux derivative, and potentially other processing modules 314. The edge sensor 300 monitors traffic from various wireless stations within range to collect metadata and reports or relays the metadata via the available communications hardware (the wired and/or wireless transceivers) to various other components of the WDDTAS such as server 120 or the other edge sensors of FIG. 1. The metadata may include various information about data, devices, communications, sessions, and identify other information that is not part of the raw unprocessed signals themselves. For example, metadata may include device vendor similarity metrics, device location similarity metrics, and a collection of past networks to which the device has previously connected, similarity profiles of channels, data rates, etc.

Signals emitted by wireless stations near or in proximity to each edge sensor may be pre-processed by the edge sensor as they are captured. For example, in edge sensor 300 they may be pre-processed by monitoring processing module 311, which contains code logic (in software, hardware, or firmware) to enumerate the underlying protocol (e.g., the IEEE 802.11 protocol, which defines how wireless devices communicate) in order to extract relevant information from each frame. As an example, the underlying protocol may indicate that an 802.11 Probe Request was generated and the edge sensor can filter out other frames and relay only relevant data from the Probe Request. Additionally, according to 802.11 the Probe Request is a management frame that stores data in a particular sequence so the edge sensor can preprocess the frame to store only the metadata of interest. This strategy can make optimal use of network bandwidth and can act as a filter for irrelevant information before being passed onto another edge sensor or the server. In some example edge sensors, the code logic that performs such preprocessing is external to the edge sensor (e.g., running as an application on the edge sensor computer system) or embedded on a dedicated device used as an edge sensor In some example edge sensors and WDDTAS platforms, additional processing of the metadata make take place. For example, the edge sensor 300 may contain some machine learning or statistical logic as other processing modules 314 to post process some of the data if the location of the wireless station is to be pinpointed by the edge sensor. In other examples, this type of post processing is performed by a server or at some other location so as to minimize power consumption of the edge sensors. As another example, edge sensor 300 may include a command interface as part of other processing modules 314 that allows another entity such as a server to direct the edge sensor to perform a task. For example, the server may detect that a user's device has entered a "payment zone" that a retailer has designated (using the server's location processing). The server can then issue a command to the edge sensor to initiate a payment process on the user's device (assuming the device is running an application allowing the edge sensor to communicate with it).

Figure 4:
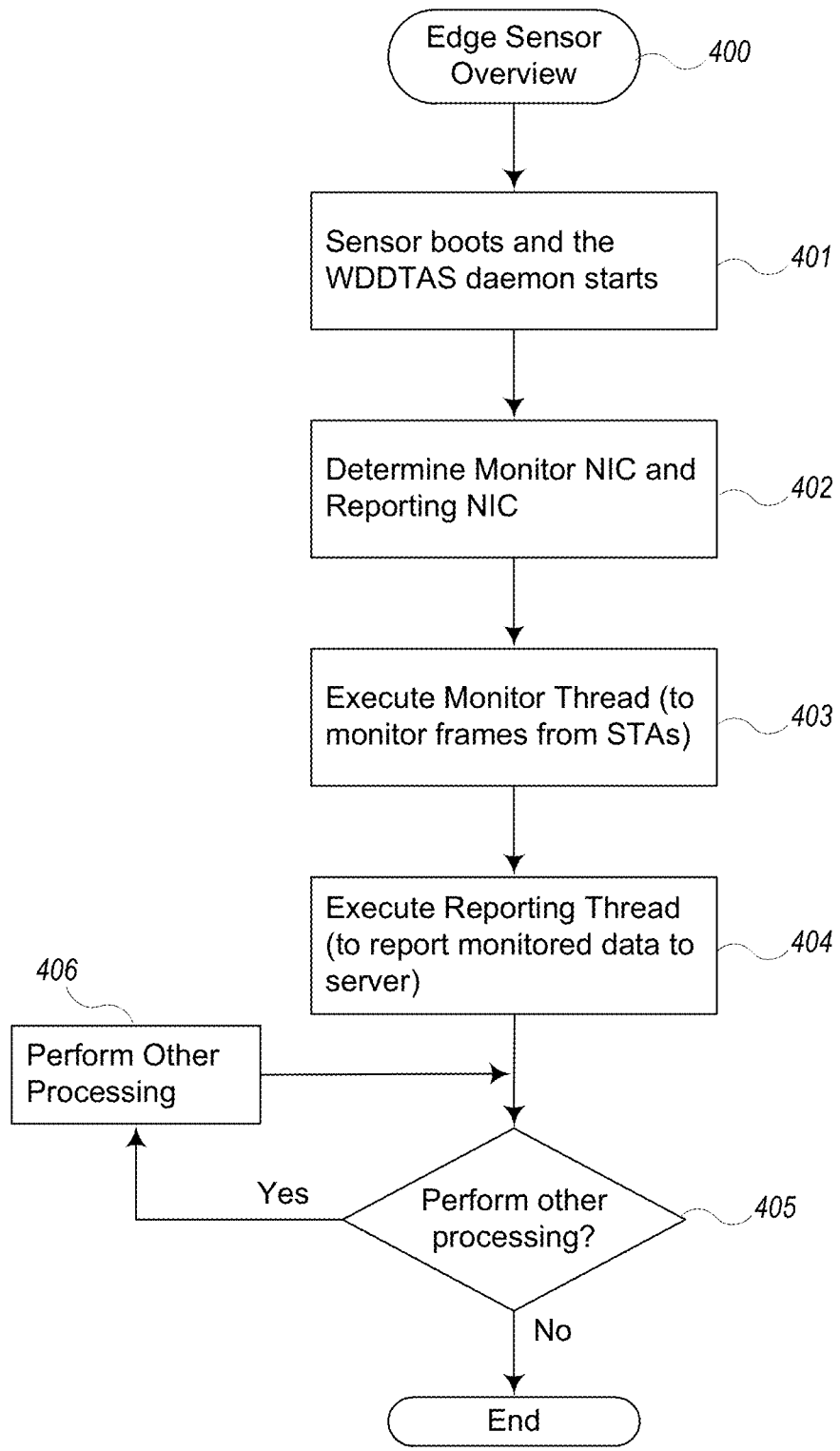
FIG. 4 is an example overview flow diagram of the logic for capturing and reporting wireless station metadata using an example edge sensor component of an example embodiment of a Wireless Device Detection, Tracking, and Authentication System.

One of the primary functions of an edge sensor is to monitor (wireless) traffic and report information (metadata or other information) to other destinations of the WDDTAS. FIG. 4 is an example overview flow diagram of the logic for capturing and reporting wireless station metadata using an example edge sensor component of an example embodiment of a Wireless Device Detection, Tracking, and Authentication System. Edge Sensor logic 400 begins in block 401 when the sensor boots and a WDDTAS daemon process (in the background and continuous) begins. In block 402, the logic enumerates the network interfaces available (e.g., Ethernet, WLAN, and BT) using, for example, an operating system API and determines which is the NIC to be used for monitoring and which for reporting. In some instances these are separate NICs, but in others they are not. In block 403, the logic begins execution of a monitor thread to monitor traffic from the wireless signals (from, for example, 802.11 WiFi and BT bands). This thread is described further with respect to FIG. 5. In block 404, the logic begins execution of a reporting thread to report monitored data, for example to a server. In logic blocks 405 to 406, the edge sensor performs other processing as needed until it is terminated (for example turned off).

Figure 5:
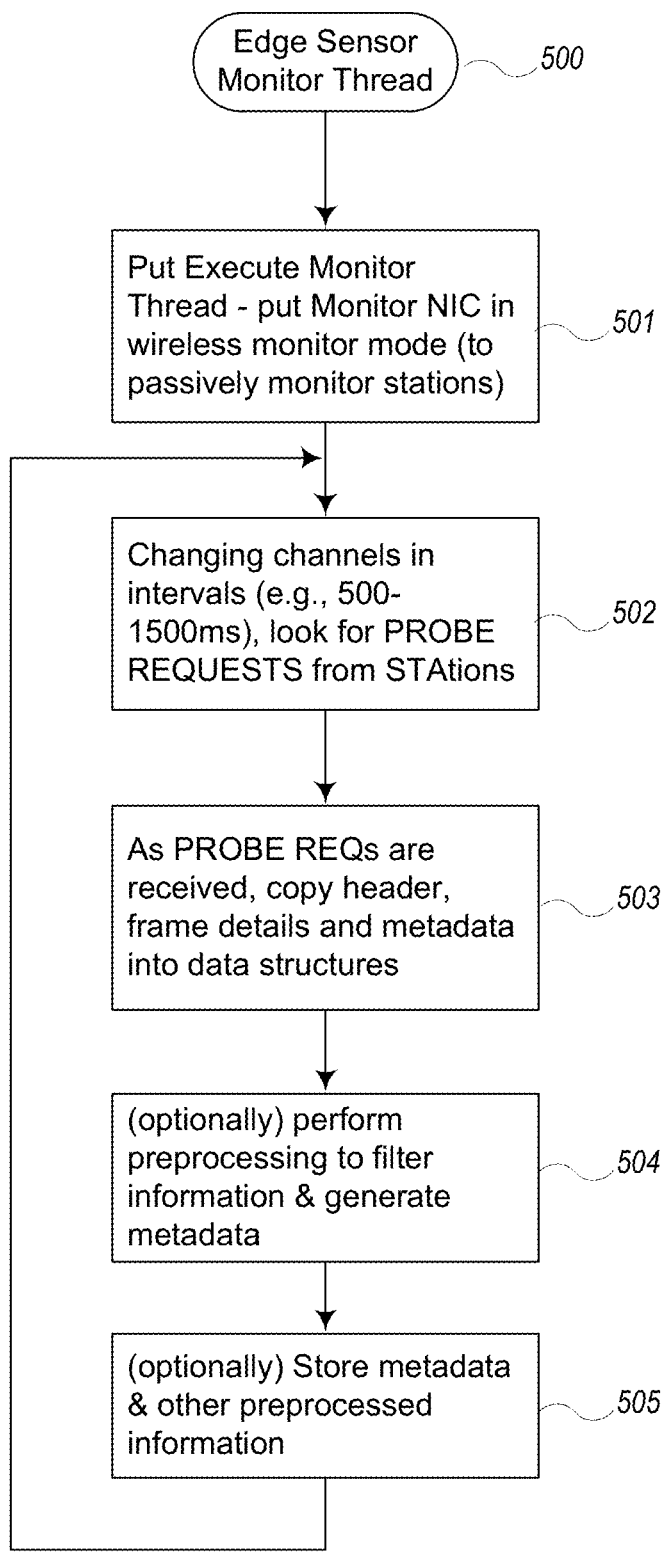
FIG. 5 is an example flow diagram of the monitoring logic of an example edge sensor component of an example embodiment of a Wireless Device Detection, Tracking, and Authentication System.

As described, the edge sensors based upon their placement (relative or absolute, dynamic or fixed) in the installation define a target area or zone. Each edge sensor is placed around the target area, and constantly monitoring for and collecting wireless signals on the 802.11 WiFi and Bluetooth bands. FIG. 5 is an example flow diagram of the monitoring logic of an example edge sensor component of an example embodiment of a Wireless Device Detection, Tracking, and Authentication System. The monitoring thread 500 is responsible for continuously collecting signals over the wireless networks—the 802.11 WiFi and BT bands.

In block 501, the logic places the determined monitor NIC into wireless monitor mode. Monitoring of 802.11 management frame traffic is performed by placing the edge sensor in "monitor" mode (for example using Linux' "iwconfig" command) and picking up/filtering for Probe Request management frames. In particular, while in monitor mode, the edge sensor passively listens for traffic and does not respond to a Probe Request with a Probe Response so as not to begin a connection to the noticed station (which requires authentication and association in addition to this handshake). In addition, the edge sensor does not send out 802.11 Beacons (Beacon management frames) to let stations know of its availability. The monitored traffic will contain a copious amount of data and the edge sensor may preprocess the data to only consider Probe Requests.

In block 502, the edge sensor logic changes channels (listens to different frequencies) in various intervals, for example 500-1500 ms intervals, searching for Probe Requests from stations in its vicinity (and within the target zone). When these Probe Requests are received, then in block 503 the various header details of the Probe Request Management Frame and other relevant data or metadata are captured into data structures stored in the memory of the edge sensor. The metadata is intended to form a bigger picture of the surveyed area—that is data about the data being collected by the target zone or from an aggregate of a group of edge sensors (or the whole WDDATS installation). In block 504, the edge sensor logic may perform preprocessing on the collected data to generate metadata which is then stored in block 505. The logic then continues back to look for more Probe Requests in block 502. Of note, the preprocessing may be performed in a separate thread once the Probe Request data is extracted.

The 802.11 wireless network frames (or other network equivalent) issued by wireless stations within a target zone reveal MAC address, signal level, noise ratio, vendor info, device hostname, past wireless networks, and other information. This information is then used to compute additional details (e.g., on the server), such as device vendor similarity metrics, device location similarity metrics, and/or a collection of past networks. Through the collection process, and based on the signal strengths detected at each edge sensor, and any known obstacles between the sensor and the targeted device, the device locations are also determined.

As noted, as part of desired metadata, the edge sensor accumulates a history of the wireless networks to which the station has previously connected. According to the 802.11 wireless specification (RFC) as designated by EIFT/IEEE, wireless stations (phones, laptops, smart television, refrigerator, and other IOT devices, etc.) that are not currently connected to the network will periodically scan for networks in the area, and in-particular issue 802.11 Probe Requests in an attempt to find and connect to known wireless networks. Thus, a sequence of Probe Requests from the same station (in a small burst of time) will reveal each of the networks that the station is scanning for. The edge sensor logic can extract this information from the Probe Request management frames and populate a data structure with a history of previous wireless connections as well as other information that can lead to metadata that can be used to profile the device. For example, if it is known that a particular device frequents location 1 followed by location 2 at the same time every Sunday, then a device location profile can be established.

Figure 6A:
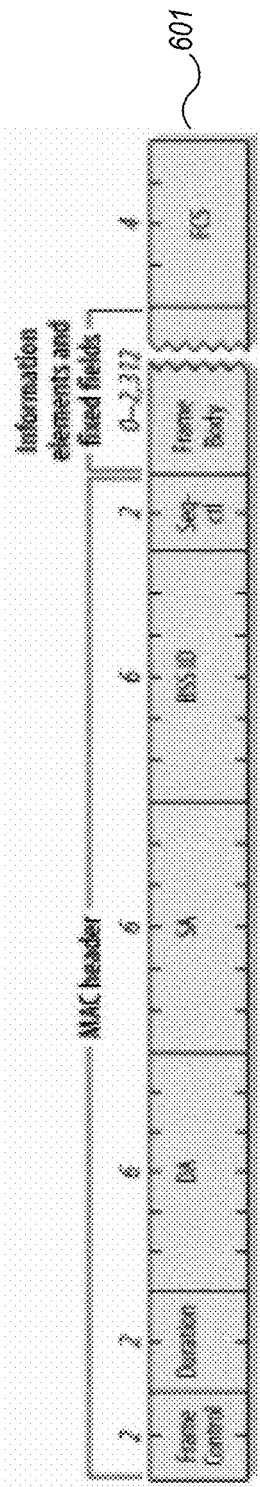
FIG. 6A is an example block diagram of Management Frame and a Probe Request according to the 802.11 Specification.
Figure 6A:
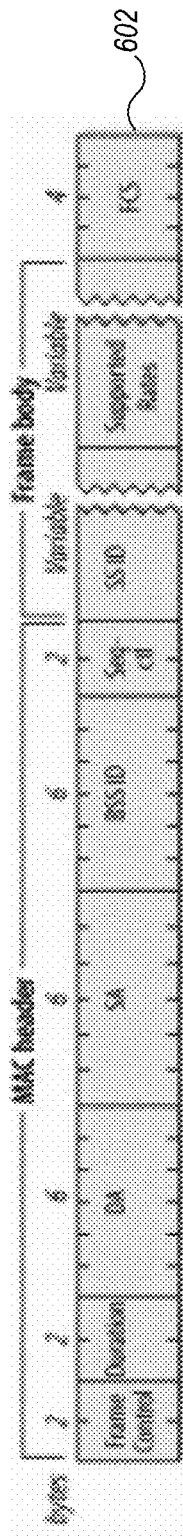

FIG. 6A is an example block diagram of Management Frame and a Probe Request according to the 802.11 Specification. Management Frame 601 contains a MAC header, which indicates the address of the station sending the frame (field "SA" for source address, transmitter address "TA" may be the same) and a Frame Body which, for a management frame, contains both fixed and variable length field. Probe Request 602 is one type of management frame. This request includes as field "SSID" (Service Set Identity field) a desired network that the station is scanning for. Other fields in the frame body contain information such as supported rates, extended supported rates, frequency hopping information, etc. Additional information regarding the specifics of the 802.11 protocol, management frames, and probe requests in particular is detailed in Gast, 802.11 *Wireless Networks, The Definitive Guide*, O'Reilly, 2d ed., 2005, which herein incorporated by reference in its entirety.

Figure 6B:
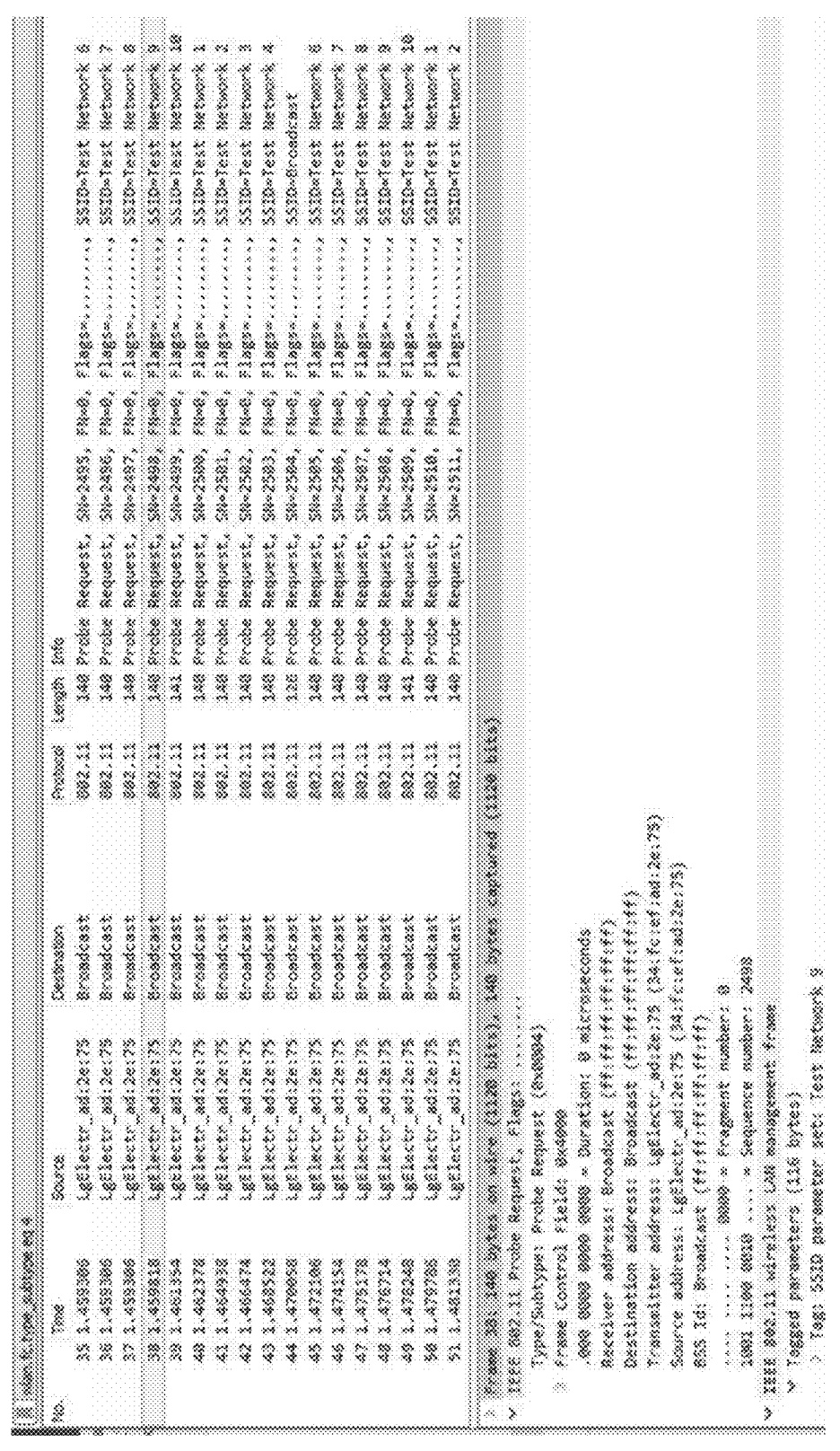

FIGS. 6B and 6C illustrates an example capture of data from a Probe Request of a wireless station containing metadata applicable to an example Wireless Device Detection, Tracking, and Authentication System. The data has been captured through a wireless data capture analysis tool (Wireshark). In this example screen, line number 38 contains information regarding a Probe Request picked up from a station named "LgElectr_ad" with a MAC address of "34:fc:ef:ad:2e:75." Although not the case for all Probe Requests, this particular request is being broadcast to any Access Point that will answer it (i.e., the destination address is ff:ff:ff:ff:ff:ff). As can be seen from the user-friendly information (laid out by the wireless data capture analysis tool), the SSID field contains the name "Test Network 9." The additional capabilities (fields of the frame body) can be observed in FIG. 6C, which lists information such as the Supported Rates 1, 2, 5.5 and 11 (Mbit/sec), the current channel ("1"), vendor specific information such as that the station is a Broadcom device, and other data and capabilities. If one were to view the content of each of frames indicated by lines 35-43, one could observe that they were all being transmitted on the same channel (microseconds apart) and indicated different networks—the networks the station is scanning for. The bottom portion of the display shows the actual bits being monitored (without the user-friendly translation). Other information is available via the radiotap wireless header (not shown), including the channel, the frequency, the signal strength, and a timestamp.

Accordingly, the edge sensor logic in block 503 of FIG. 5 can populate appropriate data structures with the type of information from the management frame illustrated in FIGS. 6B and 6C and the radiotap header. The details available can be used to further uniquely identify a station (device) not just by its MAC address, but also via its history, hostname, time of detection, vendor, and status. This history (and thus a profile) of a device can be calculated (generated) from the stored names and addresses from each frame that the device emits. The server can then cross-reference this information with the information about the other detected devices. This allows the platform to automatically determine similarities between detected devices.

For example, it may be detected that the wireless devices belonging to two people had traveled to the same house (previously had connected to the same WiFi) In such case, the devices (and people associated with them) are considered related entities within the system. This abstraction makes it easier to learn whether two devices may be related, even though the WDDTAS has not seen them before. For example, an administrator of the platform could configure platform to receive notifications upon arrival of probe requests from newly detected devices within the target zone. Upon these notifications, the administrator can compare the profile of the newly detected device other others known and decide whether to further act (e.g., send out surveillance alerts etc.). Also for example, the WDDTAS might detect a laptop and a phone on opposite sides of the target area, but be able to relate them together as a single entity (or threat), because those devices previously had been connected to similar wireless networks.

By providing a device similarity metric, for example as an abstraction such as a percentage, a profile vector (e.g., a vector containing a value for each characteristic being monitored such that vectors can be mathematically compared), etc. a user of the platform (e.g., an administrator, an end user, a third party accessing data of the installation) can determine if several of the same devices suddenly appeared within a targeted area. Further, the user might want to receive alerts if devices similar to a targeted (or specified) device come within range of a certain area (the signature or profile of a device then can be used for "targeting" similar devices). Such capabilities can provide unique defense, security, and commercial applications. This is of course dependent on the quality of the information emitted from the device. If a device is running the WDDTAS client application (thus, for example, turning a phone into a bidirectional communication device such as an electronic tag), there will be additional data available for collection and the quality of the profiling and/or target can be enhanced because it contains more and more valuable information.

Figure 7:
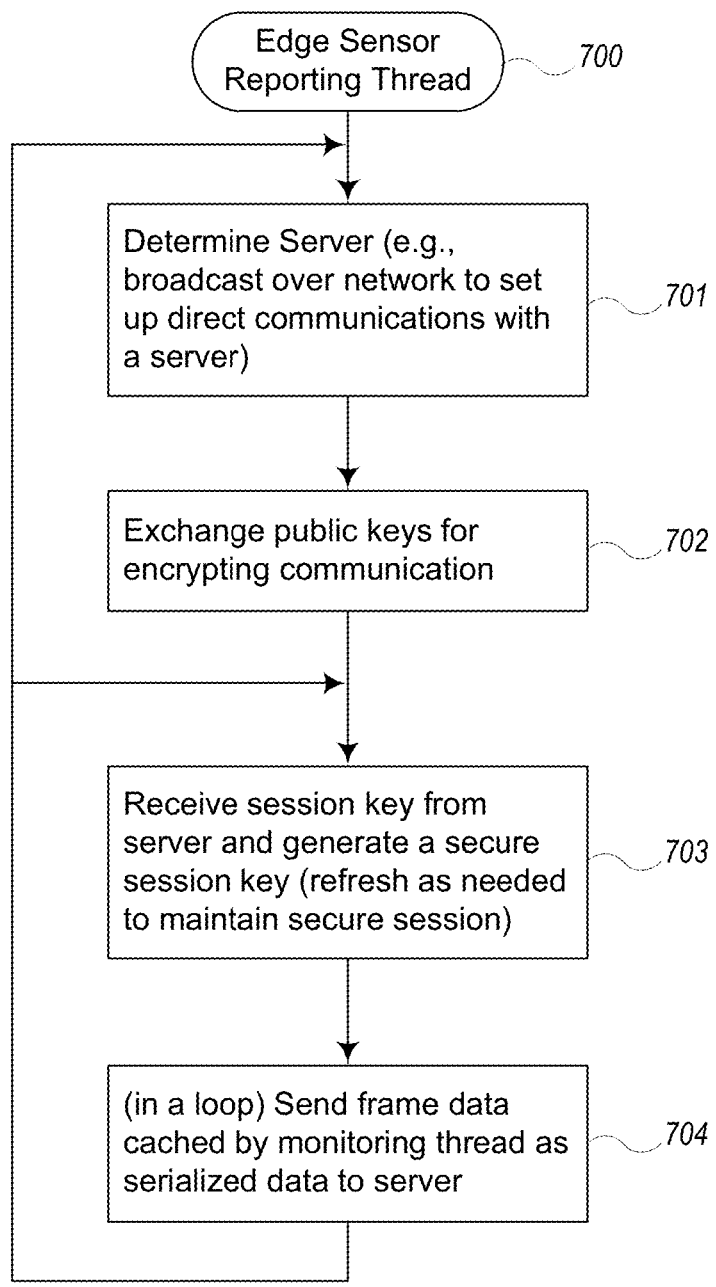
FIG. 7 is an example flow diagram of the reporting logic of an example edge sensor component of an example embodiment of a Wireless Device Detection, Tracking, and Authentication System.

Once the wireless probe request data and metadata is captured, the edge sensor then reports (forwards, relays) it as appropriate to other edge sensors, servers, etc. FIG. 7 is an example flow diagram of the reporting logic of an example edge sensor component of an example embodiment of a Wireless Device Detection, Tracking, and Authentication System. The edge sensor reporting thread 700 is responsible for relaying data. In block 701, the logic determines which server to which to send the data using path cost analysis described with reference to FIG. 2 as needed. In one example WDDTAS, a message is broadcast over the WDDTAS distribution network to set up direct communications with a specific server. Then in block 702, the determined server and the edge sensor exchange public keys to begin an encrypted session to facilitate encrypted communication (using available public/private key encryption techniques and negotiation such as RSA with a Diffie-Hellman key exchange). For example, in block 703 the edge sensor receives a session key for the determined server which has been encrypted with the sensor's public key. The edge sensor then generates an secure session key for a specific period of time for encrypting and sending the data to report. For example, the edge sense can use a Blowfish cipher or SHA-512 to generate a secure session key to encrypt the data using AES 128/256. In block 704, the data is serialized, encrypted using the secure session key and sent to the determined server. The logic then continues to block 703 to refresh secure session key and send encrypted data to that server until the edge sensor needs to determine and send data to a different server (in which case the logic continues in a new loop in block 701). Of note other encryption and key exchange techniques may be also incorporated.

Figure 8A:
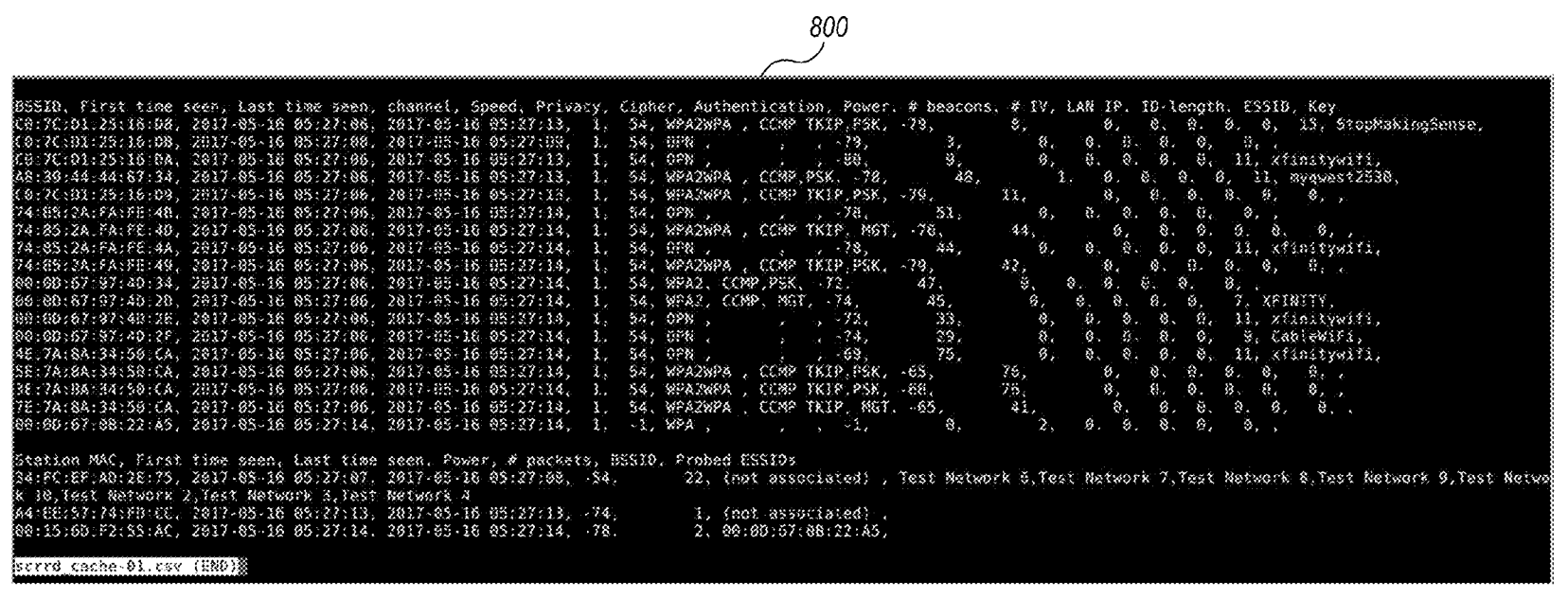
Figure 8B:
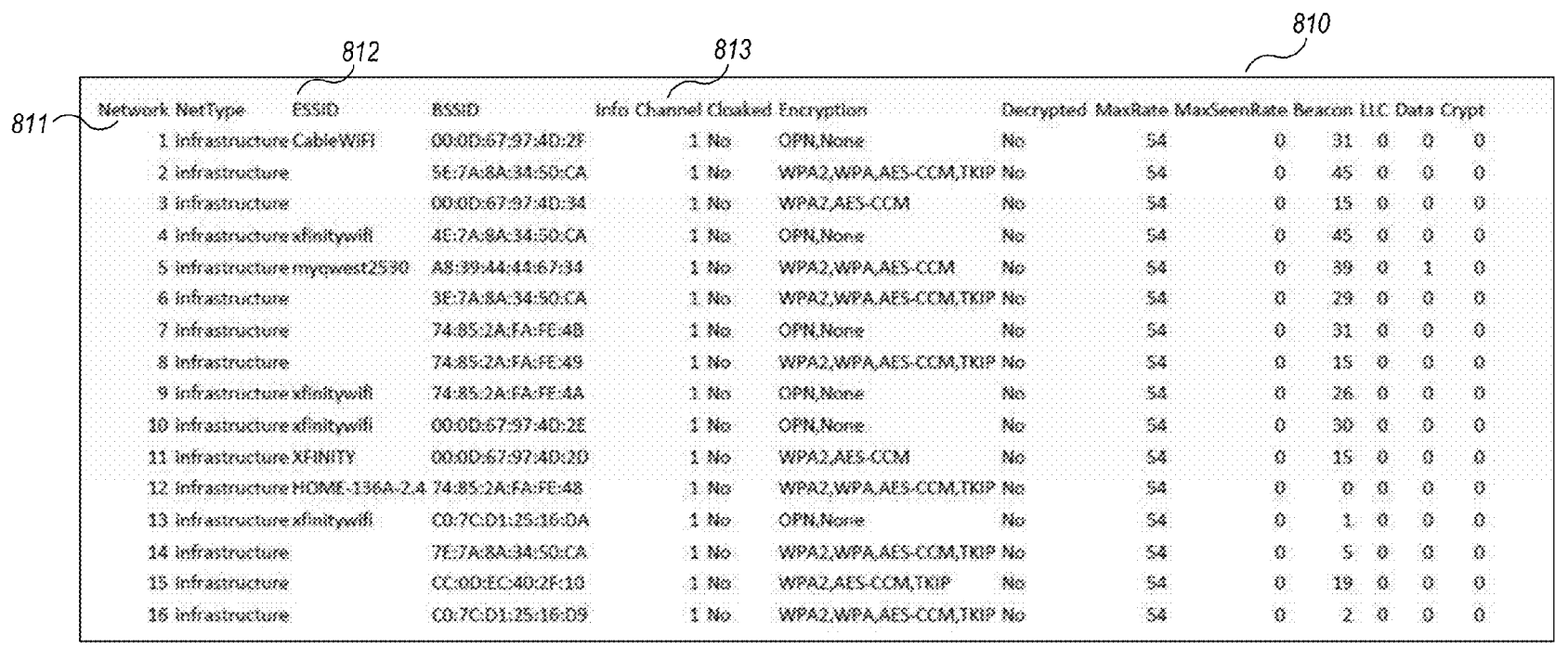

FIGS. 8A and 8B are examples of serialized data from a Probe Request of a wireless station containing metadata to be reported by an edge sensor to a server. Serialized data 800 is shown with a multitude of columns reflected the data such as that shown in FIG. 6B. For ease of readability, an excerpt of this serialized data is displayed in table 810. The serialized data contains an indication of a network (ESSID 812) from the device's history, channel used 813, and other information.

In addition to passively collecting wireless signals being emitted by wireless stations such as phones and laptops, a WDDTAS installation, such as that described with reference to FIG. 1, supports interactions with "electronic tags" to glean information. These electronic tags are "smart" electronic tags, which allow for two-way communication with an edge sensor for the purpose of authentication and sharing data. In FIG. 1, stations 108 and 106 are example electronic tags which communicate bidirectionally with edge sensors 111a and 110b, respectively. A device is an electronic tag because it is running additional (WDDTAS) code or logic that can verify the integrity of the tag, the identity of the user, or because it can share additional details it has about the device. In general, a device augmented with a software application such as the WDDTAS client application is an electronic tag because it is running software that is causing it to act as such, emitting a signal on some interval, and responding to requests instead of just being passive.

Electronic tags can also provide data collection from other types of physical sensors associated with the tag (device) and forward such data collection to an edge sensor and/or WDDTAS server. For example, a device that serves as an electronic tag may provide data from sensors that measure attributes of the device or environment such as temperature, barometric pressure, magnetic resonance, photo voltage, and the like.

Additionally, a wireless computer or phone can become an electronic tag by installing a WDDTAS client application that causes it to behave in this manner. This effectively turns any smartphone into an electronic tag. Electronic tags are unique and provide a way to reliably identify people and goods that is not dependent, for example, on attaching physical tags such as RFID tags. In addition, when used in security applications, the tag software can digitally sign a message with its public-key to the edge-sensor, and thus to the server, for verification.

As an example, this technique can be used to provide enhanced authentication to a device, determine or pinpoint location of a device, or collect additional data. Enhanced authentication can provide confirmation from multiple sources about the identity of a person using the device. Such sources might include: something the user has in their possession, like a computer, phone, or electronic tag; something the user is, for example one's unique biology, fingerprint, face, heart rate, DNA, or iris scan; and/or something the user knows, such as a password or secret used to prove their identity.

Because mobile devices can become electronic tags by incorporation of WDDTAS client application, tags can be used as authentication tokens such as for consumer purchases and transactions. For example, a customer, carrying an electronic tag in the form of a smartphone, may walk near to a payment area, verify their identity (to the WDDTAS application running on the phone), and then automatically pay for goods or services using, for example, preconfigured payment methods. Users can opt to use multiple different factors in order to verify their identity, such as a PIN code or fingerprint for enhanced security. This makes it harder for a thief to use a stolen device for purchasing goods, as the thief would also need to know the mobile device user's pin code, password, fingerprint, facial signature, or other authentication factor, as a secondary factor during authentication as designated by the WDDTAS installation.

The user of an electronic tag device or device configured to operate as an electronic tag through WDDTAS software might prefer to cryptographically verify the tags in order to provide accurate validation. The process generally follows the RSA large prime public-key cryptography standard described early. In summary, the WDDTAS software application in the device generates a public and private key pair consisting of large prime numbers. In a multi-key cryptographic system, the software on either side of the communication (here the electronic tag and the rest of the installation) sign and encrypt their messages to each other with these keys in order to prove their identity and the integrity of the data. This is done to prevent interception of collected data. The public and private keys can be located on the device within the WDDTAS client application's protected runtime. These keys can be used to provide primary authentication. By layering authentication strategies in addition to public/private key encryption, the mechanism can be made more secure.

Figure 9:
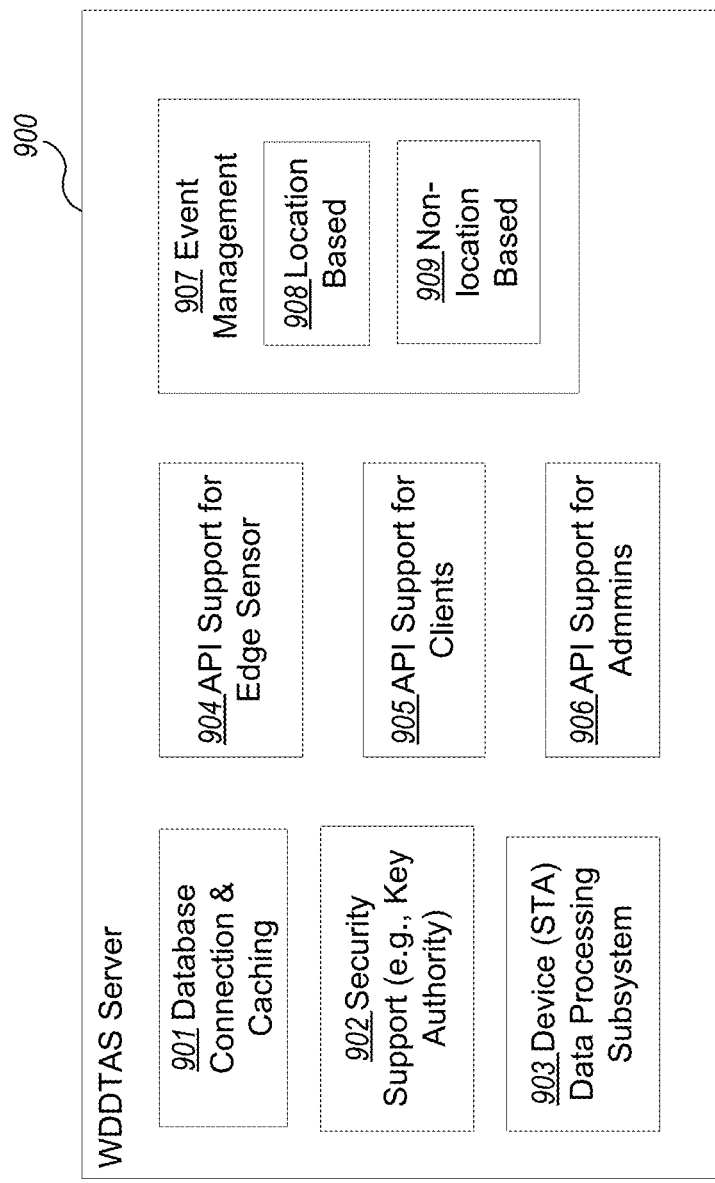
FIG. 9 is an example block diagram of logic components of an example server in an exemplary Wireless Device Detection, Tracking, and Authentication System installation.

FIG. 9 is an example block diagram of logic components of an example server in an exemplary Wireless Device Detection, Tracking, and Authentication System installation. As described there may be more one server in any particular WDDTAS installation, and server 120 of FIG. 1 is one such example. Servers within the WDDTAS are responsible mainly for storing the wireless signal metadata relayed from the edge sensors as described with reference to FIG. 7. Even when the server is physically incapable of connecting to an specific edge sensor, the server may glean its data from another intermediate edge sensor that has relayed the information which could not be sent directly because the specific edge sensor is out of communication. For example, in FIG. 1, the data from edge sensor 111a may be relayed from edge sensor 111b if sensor 111a cannot send the data directly to server 120.

The example server illustrated in FIG. 9 comprises: data connection and caching 901, security support (module, component, logic, code, etc.) 902, device data processing system 903, various API endpoints to support edge sensors 904, clients 905, and admins 906, and event management support 907.

The database connection and caching interface 901 is responsible for connections and communications to edge sensors, administrators, and API users. The server can accept connections from administrators, edge sensors and API users, while simultaneously postprocessing relayed data, storing data in its database, and generating events and notifications. The security module 902 is responsible for the encrypted communication exchanges described earlier and the maintenance of all of the keys for each edge sensor, client, and administrator.

Database connection and caching interface 901 is also responsible for storing or caching data in a data repository, such as repositories 130 and 131 in FIG. 1. Users of a WDDTAS installation may opt to use a specific database back-end to suit the needs of their organization, so that they can authenticate their users against another backend. Since data is being cached and persisted in the data repository, there is a structure that represents the state of each device as seen from each edge sensor. In this way the relevant most recently detected signals from a device get persisted for 30-90 seconds or for a few minutes until they can be expired and replaced with updated data from a next time period.

The device data processing system 903 comprises code for performing the postprocessing of the device metadata to, for example, generate similarity metrics, identify device pinpoint locations in instances where the edge server is not providing such support, facilitate transaction and purchase processing, etc. It is continuously looking for new data, extracting metadata, computing metrics across sensors, and the like. In installations where machine learning is available, the data processing system 903 can incorporate machine learning engines and algorithms to learn about device behavior over time, for example, and to improve similarity metrics using metadata from the device profiling.

The various API endpoints provide implementation for the logic accessed through the API to administrators of the WDDTAS, to client applications on devices that are running the WDDTAS client application, and to various end users such as third party users of data. The API can be used to manage and aggregate data from each installation or from multiple WDDTAS installations as an authentication back-end.

Figure 10:
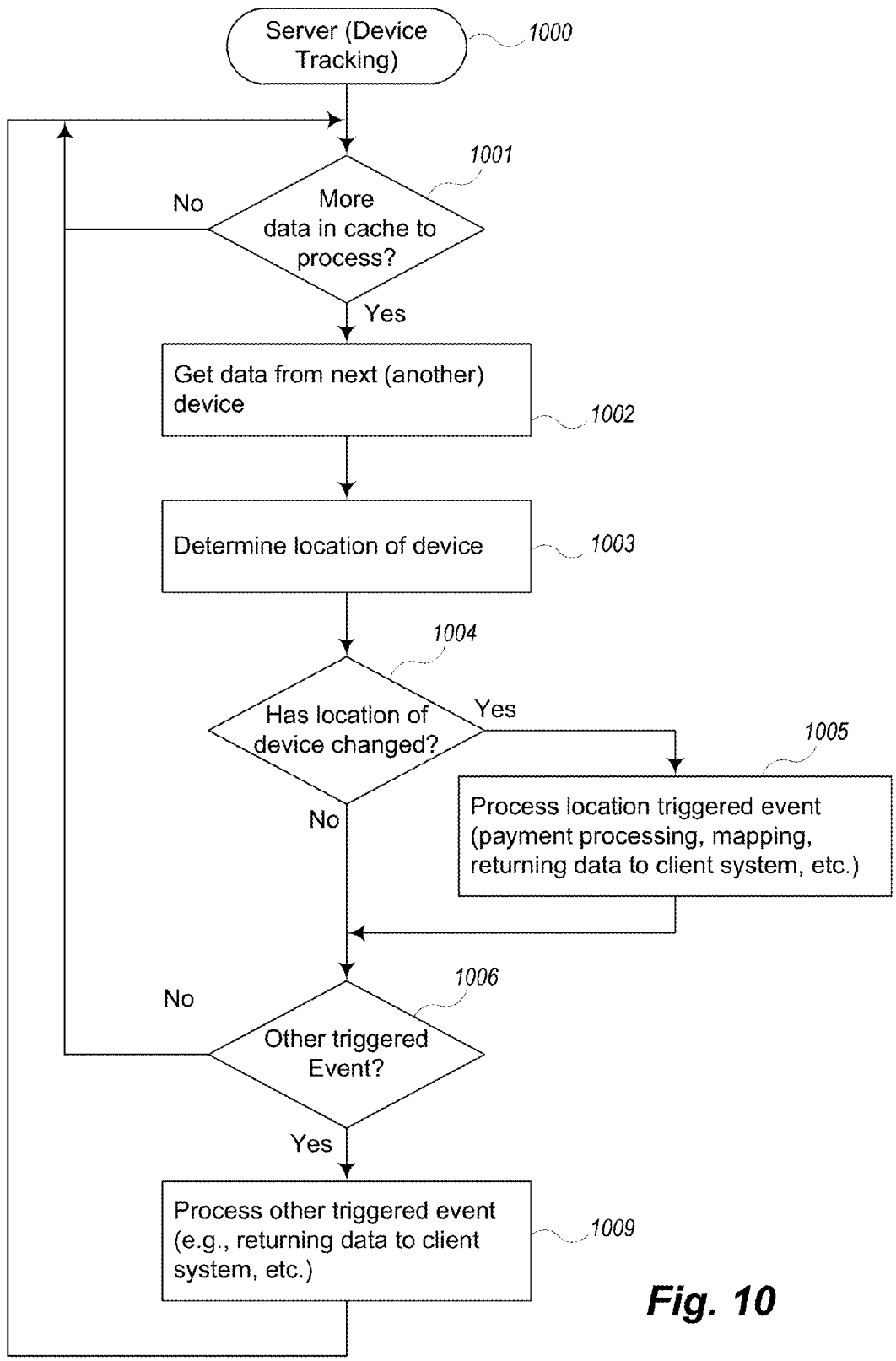
FIG. 10 is an example flow diagram of tracking logic executed on an example server in an example embodiment of a Wireless Device Detection, Tracking, and Authentication System.

Event management support 907 facilitates processing of alerts and notifications. In particular, alerts and notifications may be location sensitive/based (such as device triggers within a target zone) or may be location independent (such as a transaction. Location based event management 908 and Non-location based event management 909 support for these two different types of events respectively. A user of the WDDTAS installation can also set up options for these alerts and notifications. Since the system is caching a lot of data, the cached data can be compared against the platform user's alerts and notifications to determine if there is any cause to generate an event or push a notification to the user. For example, the event management support can push a notification to possibly warning the user that an item has left the sales floor, or a person has entered the target area, or that a device user wishes to begin an authentication transaction FIG. 10 is an example flow diagram of tracking logic executed on an example server in an example embodiment of a Wireless Device Detection, Tracking, and Authentication System. The server logic 1000 may be performed, for example by server 120 in FIG. 1. Server logic 1000 performs a loop in blocks 1001-1009 to continuous process data, respond to API request, trigger events and notifications, locate devices, etc.

Figure 11D:
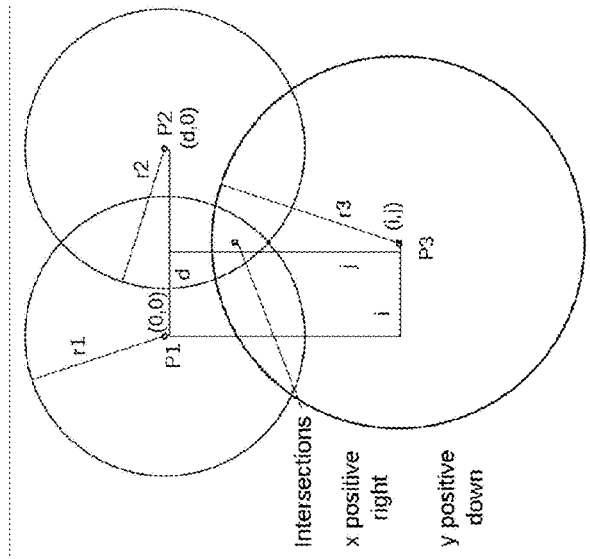
FIGS. 11A-11D are example diagrams illustrating trilateration and other techniques to find a location of a wireless station using one, two, and three edge sensors or other known locations.
Figure 11C:
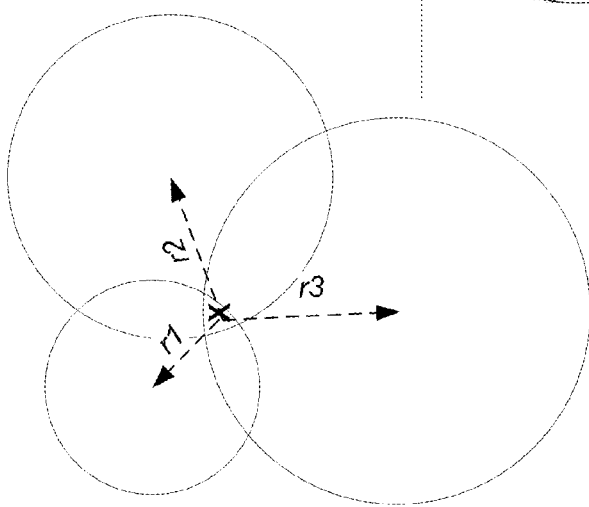
Figure 11A:
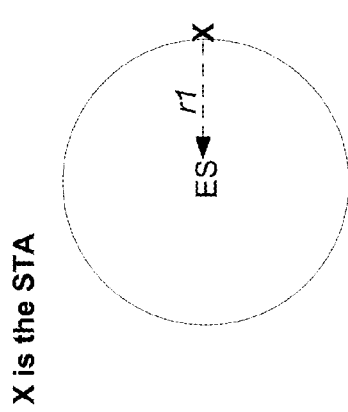
Figure 11B:
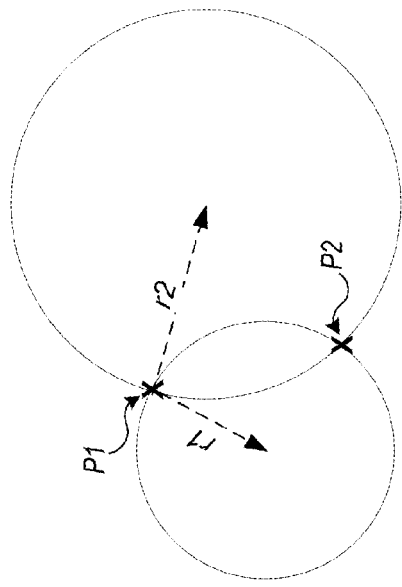

Specifically, in block 1001, the server logic determines if there is more data to process. If so, the logic continues in block 1002, otherwise returns to block 1001 (to wait for more data). In block 1002, the server logic obtains data from the (next) device or more data from the same device. In block 1003, the server logic determines the location of the device. Although the logic shows this calculation being performed at this time, it can be performed at multiple or other times while executing this process. Determining device location can be performed using a variety of techniques. Trilateration, such as that described with reference to FIGS. 11A-110 is preferred, and when not available or to provide a secondary method for verifying accuracy of location, other techniques may be incorporated such as using GPS technology or GSM (cell network techniques). In addition, publicly available API for geolocation (such as from GOOGLE) may provide fallbacks.

Once the device location is pinpointed, then the server logic determines whether the location has changed and, if so, continues in block 1005, otherwise continues in block 1006. In block 1005, the server logic processes any location triggered events such as payment processing, mapping location, returning data to a client application regarding the location of devices, and the like. This logic may be performed by logic module 908 in FIG. 9.

In block 1006, the server logic determines whether any other events have been triggered and, if so, continues in block 1009, otherwise returns to the beginning of the loop in block 1001. In block 1009, the server logic process other triggered events and/or notifications such as returning data to a client, changing edge sensor settings, etc. This logic may be performed by logic module 909 in FIG. 9. The server logic then continues to the beginning of the loop in block 1001.

FIGS. 11A-11D are example diagrams illustrating trilateration and other techniques to find a location of a wireless station using one, two, and three edge sensors or other known locations. Trilateration algorithms in essence calculate a distance in a two or three dimension (2D or 3D) plane using a devices distance from preferably three locations. It is possible to adapt these algorithms to a 3D version, which utilizes spheres instead of circles (see 11D).

In the case where the server is locating a device with reference to a single edge sensor (FIG. 11A), then a Free Space Path Loss (FSPL) algorithm is used to compute distance. The FSPL algorithm is shown in equation (1):

$$FSPL = 20\log_{10}(d) + 20\log_{10}(f) + 20\log_{10}(4\pi/c) - G_t - G_r \quad (1)$$

FIG. 11A demonstrates the "X" (the location of the device/station) can be determined by a simple distance (radius) r1 from an edge sensor. According to FSPL, signal loss can be used to calculate distance since it increases with distance. Here "$G_t$" and "$G_r$" are gain (in dBs) of the transmitter and receiver respectively and "c" is the speed of light in meters/sec.

In the instance where the server is locating a device with reference to two edge sensors (FIG. 11B), then trilateration can be used to narrow the location to two possibilities, P1 and P2, distance r1 and r2 respectively from the edge sensors. (Each edge sensor can compute its distance "r" to the device using the FSPL algorithm.) In this case, where possible, a secondary method may be employed (e.g., GPS or GSM) to choose between the two possible locations.

When three or more edge sensors can be used to locate a device, then trilateration can be used effectively to pinpoint the location of the device to the point at which all three circles intersect. FIG. 11C shows this analysis logically. (The distance from the device to each edge sensor is again computed using FSPL.) Note that in practice, there is some error so that the logic needs to average out the points that the server logic obtains from multiple groups of three sensors.

Several algorithms for implementing trilateration are available. A discussion of those currently available is described in "https://confluence.slac.stanford.edu/plugins/servlet/mobile#content/view/907686," incorporated herein by reference in its entirety. In addition, a publicly available algorithm is described in Wikipedia, "en.wikipedia.org/wiki/Trilateration," herein incorporated by reference in its entirety. The essence of this algorithm is to find a point located at (x, y, z) that satisfies the following equations for three spheres shown in equation (2):

$$r_1^2 = x^2 + y^2 + z^2$$

$$r_2^2 = (x-d)^2 + y^2 + z^2$$

$$r_3^2 = (x-i)^2 + (y-j)^2 + z^2 \quad (2)$$

Where P1, P2, and P3 (referring to FIG. 11D) are the centers of three spheres, and their sphere radii are r1, r2, and r3, respectively. In equation (2) "d" is the x-coordinate of point P2. It is subtracted from "x" to obtain the base of the triangle between the intersection and r2. The trilateration solution described therein, the x-coordinate of the point is found in equation (3), the y-coordinate is found in equation (4), and the z-coordinate is found in equation (5):

$$x = \frac{r_1^2 - r_2^2 + d^2}{2d} \quad (3)$$

$$y = \frac{r_1^2 - r_3^2 - x^2 + (x-i)^2 + j^2}{2j} = \frac{r_1^2 - r_3^2 + i^2 + j^2}{2j} - \frac{i}{j}x \quad (4)$$

$$z = \pm\sqrt{r_1^2 - x^2 - y^2} \quad (5)$$

Of note, it is possible for there to be zero, one, or two solutions to the problem because z is expressed as a positive or negative square root. Code corresponding to this trilateration algorithm is included in Table 1 below written in Python.

TABLE 1

| | |
|---|---|
| 1 | import math |
| 2 | import numpy |
| 3 | |
| 4 | #assuming elevation = 0 |
| 5 | earthR = 6371 |
| 6 | LatA = 37.418436 |
| 7 | LonA = −121.963477 |
| 8 | DistA = 0.265710701754 |
| 9 | LatB = 37.417243 |
| 10 | LonB = −121.961889 |
| 11 | DistB = 0.234592423446 |
| 12 | LatC = 37.418692 |
| 13 | LonC = −121.960194 |
| 14 | DistC = 0.0548954278262 |
| 15 | |
| 16 | #using authalic sphere |
| 17 | #if using an ellipsoid this step is slightly different |
| 18 | #Convert geodetic Lat/Long to ECEF xyz |
| 19 | # 1. Convert Lat/Long to radians |
| 20 | # 2. Convert Lat/Long(radians) to ECEF |
| 21 | xA = earthR * (math.cos(math.radians(LatA)) * math.cos(math.radians(LonA))) |
| 22 | yA = earthR * (math.cos(math.radians(LatA)) * math.sin(math.radians(LonA))) |
| 23 | zA = earthR * (math.sin(math.radians(LatA))) |
| 24 | |
| 25 | xB = earthR * (math.cos(math.radians(LatB)) * math.cos(math.radians(LonB))) |
| 26 | yB = earthR * (math.cos(math.radians(LatB)) * math.sin(math.radians(LonB))) |
| 27 | zB = earthR * (math.sin(math.radians(LatB))) |
| 28 | |
| 29 | xC = earthR * (math.cos(math.radians(LatC)) * math.cos(math.radians(LonC))) |
| 30 | yC = earthR * (math.cos(math.radians(LatC)) * math.sin(math.radians(LonC))) |
| 31 | zC = earthR * (math.sin(math.radians(LatC))) |
| 32 | |
| 33 | P1 = numpy.array([xA, yA, zA]) |
| 34 | P2 = numpy.array([xB, yB, zB]) |
| 35 | P3 = numpy.array([xC, yC, zC]) |
| 36 | |
| 37 | #from wikipedia |
| 38 | #transform to get circle 1 at origin |
| 39 | #transform to get circle 2 on x axis |
| 40 | ex = (P2 − P1)/(numpy.linalg.norm(P2 − P1)) |
| 41 | i = numpy.dot(ex, P3 − P1) |
| 42 | ey = (P3 − P1 − i * ex)/(numpy.linalg.norm(P3 − P1 − i * ex)) |
| 43 | ez = numpy.cross(ex,ey) |
| 44 | d = numpy.linalg.norm(P2 − P1) |
| 45 | j = numpy.dot(ey, P3 − P1) |
| 46 | |

TABLE 1-continued

```
47      #from wikipedia
48      #plug and chug using above values
49      x = (pow(DistA,2) − pow(DistB,2) + pow(d,2))/(2 * d)
50      y = ((pow(DistA,2) − pow(DistC,2) + pow(i,2) +
        pow(j,2))/(2 * j)) − ((i/j) * x)
51
52      # only one case shown here
53      z = numpy.sqrt(pow(DistA,2) − pow(x,2) − pow(y,2))
54
55      #triPt is an array with ECEF x,y,z of trilateration point
56      triPt = P1 + x * ex + y * ey + z * ez
57
58      #convert back to lat/long from ECEF
59      #convert to degrees
60      lat = math.degrees(math.asin(triPt[2]/earthR))
61      lon = math.degrees(math.atan2(triPt[1],triPt[0]))
62
63      print lat, lon
```

Other trilateration algorithms may be similarly incorporated to determine the location of a device.

When computing the location of a device using these techniques, the device can be pinpointed to at least 0.5 meter accuracy. For comparison, current GPS technology is limited to an accuracy of 4.9 meters thus the accuracy of computing the location of a device is enhanced using these techniques. Moreover, these techniques can be used for "indoor positioning," a concern for iOT platforms.

All of the above calculations assumed that the edge sensor was in a known location. As mentioned above, edge sensors can create a dynamic geofenced target zone by being placed, for example, on a moving object such as a vehicle. In this case, the server logic can poll (at some designated rate) a geolocation API for an updated location of the edge sensor, or in some cases use alternative methods to compute the area between the edge sensors.

Figure 12:
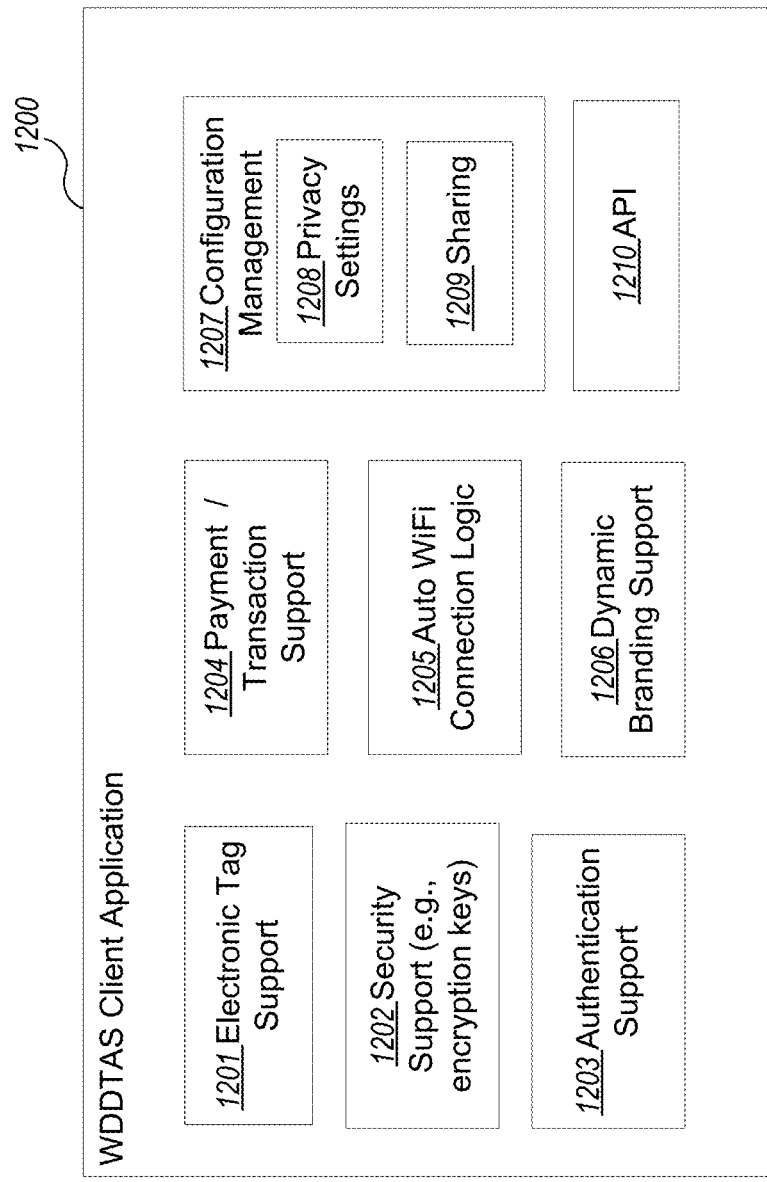
FIG. 12 is an example block diagram of logic components of an example client application for execution on a wireless station in an example embodiment of a Wireless Device Detection, Tracking, and Authentication System.

As described earlier, edge sensors may be augmented with a WDDTAS client application to improve their functional capacity such as to increase the amount and type of data collected, allow a user to opt-in for certain types of payment processing and retail applications, to provide electronic tag functionality, and the like. FIG. 12 is an example block diagram of logic components of an example client application for execution on a wireless station in an example embodiment of a Wireless Device Detection, Tracking, and Authentication System. In some WDDTAS installations, the client application may be the same as the application described below for administration and managements of the WDDTAS.

As illustrated in FIG. 12, WDDTAS client application comprises electronic tag support 1201 (component, code, logic, module, etc.), security support 1202, authentication support 1203, payment and transaction support 1204, automatic WiFi connection logic 1205, retail support 1206, configuration management 1207, and API endpoints 1210. Electronic tag support 1201 turns the device into an electronic tag for bidirectional communication with an edge server as described above. Security support 1202 allows the client device to generate their public keys. Authentication support 1203 facilitates providing augmented authentication, for example, using biometric data, pins, etc. as described above.

Payment and transaction support 1204 allows users to make payments for example, in known or permitted locations, as a result of triggering a location-based event when entering vicinity of the store's zone (created using edge sensors). Store here is used in a loose sense and may refer to any establishment that accepts payment or can conduct a transaction. This support can be run as a background service and invoked upon trigger of the location-based event.

Configuration management support 1207 manages privacy settings 1208 and the user's abilty to share with others through sharing interface 1209. For example, users may desire to turn off their WiFi when not at home and prevent being tracked (if they wish to download the WDDTAS application) using privacy settings 1208. Other accommodations may be implemented to enhance privacy of the user of the wireless device. Control of privacy settings does provide an incentive for users to download the WDDTAS application to their wireless devices. In addition, a user may desire to provide information or accepted shared provided information from another user using sharing interface 1209. For example, a user shopping in a store may wish to seek and accept help from other users in the store.

Automatic WiFi connection logic 1205 facilitates an option for users of the device (e.g., customers of a store) to automatically connect to the store's WiFi according to a store's API. Because data is continuously being collected from the device through passive monitoring, if the privacy switch is off and the user has opted-in to use of the data, then the user's data is potentially reported to the store as well.

Dynamic branding support 1206 in conjunction with API endpoints 1210 governs the ability for third parties, such as stores, hospitals, restaurants, and the like (associated with physical locations) to push logos, bios, backgrounds, color schemes, etc. to the device while the device is located within the location. In some instances, the WDDTAS may require a user to opt-in to this push notification in some form. This may operate like "style sheets" for the device. In some instances the dynamic branding support may provide push notifications to assist a user, for example, to find things or provide an immediate location-based "virtual assistant."

Figure 13:
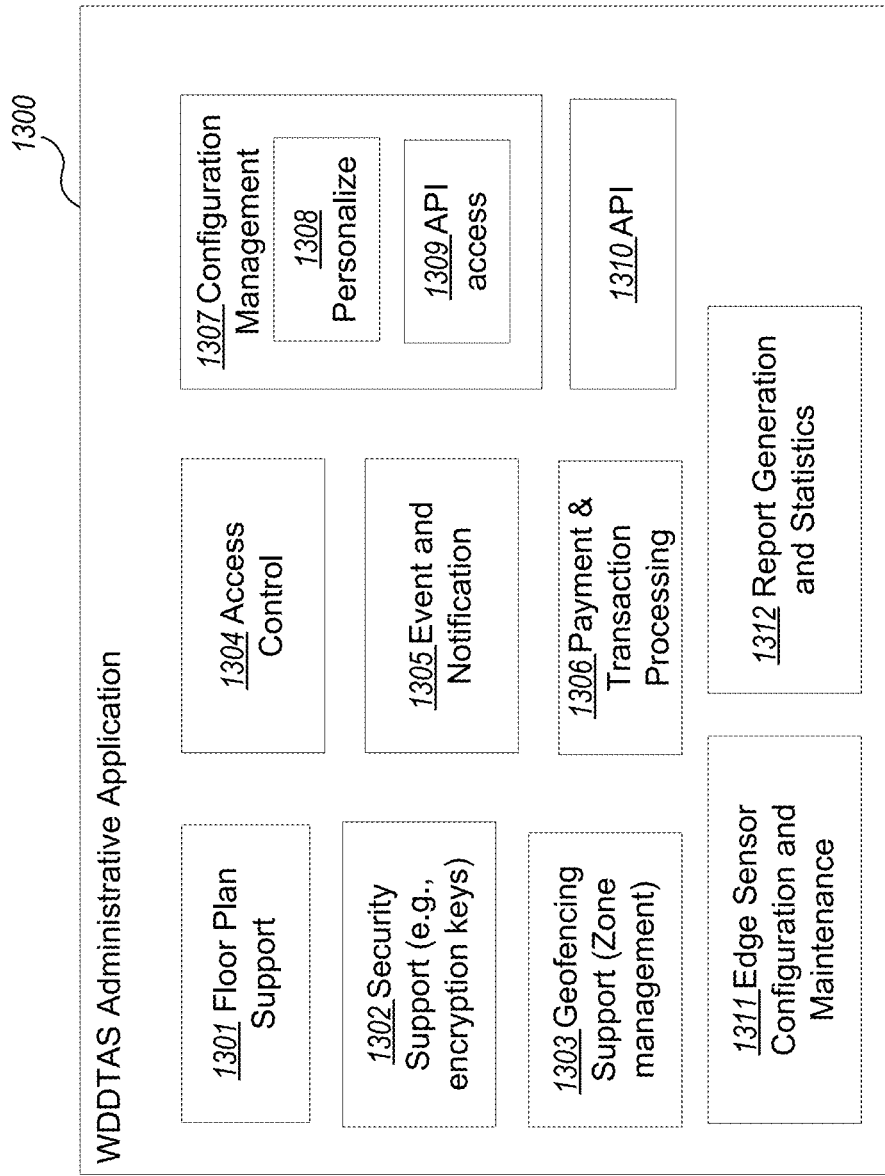
FIG. 13 is an example block diagram of logic components of an example administrative application for management of an exemplary Wireless Device Detection, Tracking, and Authentication System installation.

As described with reference to FIG. 1, configuration and management of a WDDTAS installation is typically controlled by one or more administrators or someone acting in that capacity. FIG. 13 is an example block diagram of logic components of an example administrative application for management of an exemplary Wireless Device Detection, Tracking, and Authentication System installation. The WDDTAS administrative application (or admin application) is software or other code logic running on a computer, phone, or tablet, which is used to manage the WDDTAS installation. It allows unprivileged users and privileged administrators of the WDDTAS installation to view information about the devices detected by the edge sensors in the target zones (areas defined by groups of edge sensors or other areas of interest). Depending on a user's permission level, that user can create users and groups, delegate roles, or manage user permissions for a WDDTAS installation.

As illustrated in FIG. 13, WDDTAS admin application comprises floor plan support (component, module, code, logic, etc.) 1301, security support 1302, geofencing support and zone management 1303, access control 1304, event and notification support 1305, payment processing and transaction support 1306, configuration management 1307, API endpoints 1310, edge sensor configuration and maintenance 1311, and report generation and statistics 1312.

Floor plan support 1301 allows the admin application to load floor plans or a map (preloaded or dynamically) in order to overlay computed sensor information (detected and located devices) over an area, indoor or outdoor. This can allow users of the WDDTAS installation or software used to access or manage the WDDTAS installation) to designate zones (areas of interest) between or nearby sensors. Clients of the WDDTAS installation (e.g., third party users such as within stores, hospitals, government, etc.) can then subscribe to events to be notified as they are generated. For example, as a tracked device within a WDDTAS installation moves from zone to zone, the servers (or edge sensors in some cases) can generate notifications which are forwarded to the subscribed parties or clients.

In addition the tracked devices can be visually located on the map using API support. Also, WDDTAS installation subscribed clients can search for devices near to a particular location (or relative to a specific device) with a search interface, and be shown a visual path to a specific targeted device or be shown that device's path and movement history through the area. Lots of graphical interfaces can be supported through these capabilities.

Security support 1302 allows the admin user to generate their public keys for communication with servers. It also allows the admin user to revoke an edge sensor's ability to report tracked data, etc.

Geofencing support and zone management 1303 facilitates an admin user defining a dynamic (movable) zone of edge sensors or a fixed position group of sensors (or a hybrid) that defines an area. It can also determine the distance from an admin's device running the WDDTAS admin application to any other device in the installation. Payment areas can be treated as a specific manifestation of a target zone. Payment processing and transaction support 1306 can operate in conjunction with the geofencing support 1303 to configure particular payment and/or transaction methods for a defined geofenced area. This module can also establish whether a user of a device has paid for an item before leaving a retail establishment.

Access control support 1304 allows an admin user to define access for other users, groups of users, etc. as regards configuration aspects of the WDDTAS installation, data, API access, and the like. Domains of users/groups may be established based upon a defined edge sensor zone (a target area).

Event and notification support 1305 can facilitate admin users defining "watchlists" of devices and/or zones for security applications or otherwise or defining "blacklisted" or "whitelisted" devices or device profiles. In addition, it can allow admin users to define events and/or notifications that are location or non-location based as described earlier.

Report generation and statistics support 1312 facilitates the generation of metrics regarding location of devices (such as the percentage of time a device is in zone x), traffic percentages in zones, downtime statistics regarding edge sensors, and other WDDTAS installation and/or device metrics.

Edge sensor configuration and maintenance support 1311 may monitor edge sensor traffic to determine when data is no longer being received from an edge sensor. In that instance, a visual interface can be provided to the admin user to facilitate identification of the damaged or unavailable sensor.

Configuration management support 1307 can facilitate an admin user providing or associating personalization and branding with a zone they are responsible for administering. For example, an admin user of a retail establishment (with limited admin privileges vis-à-vis the WDDTAS installation) may configure logos, backgrounds, information and the like to appear on devices that are running the WDDTAS client application (see FIG. 12). In addition configuration management support 1307 can define authorization to access APIs through API access support 1309, the format for serialized data relayed by the edge sensors to servers, etc. Configuration management support 1307 may also define attributes that influence choice of path (path cost) for reporting data from edge servers.

API endpoints 1310 provide access to the administrative support to third party applications.

Other similar or different functions for administrative access to a WDDTAS installation are similarly contemplated and can be made available using the capabilities and support of the WDDTAS admin application.

Figure 14:
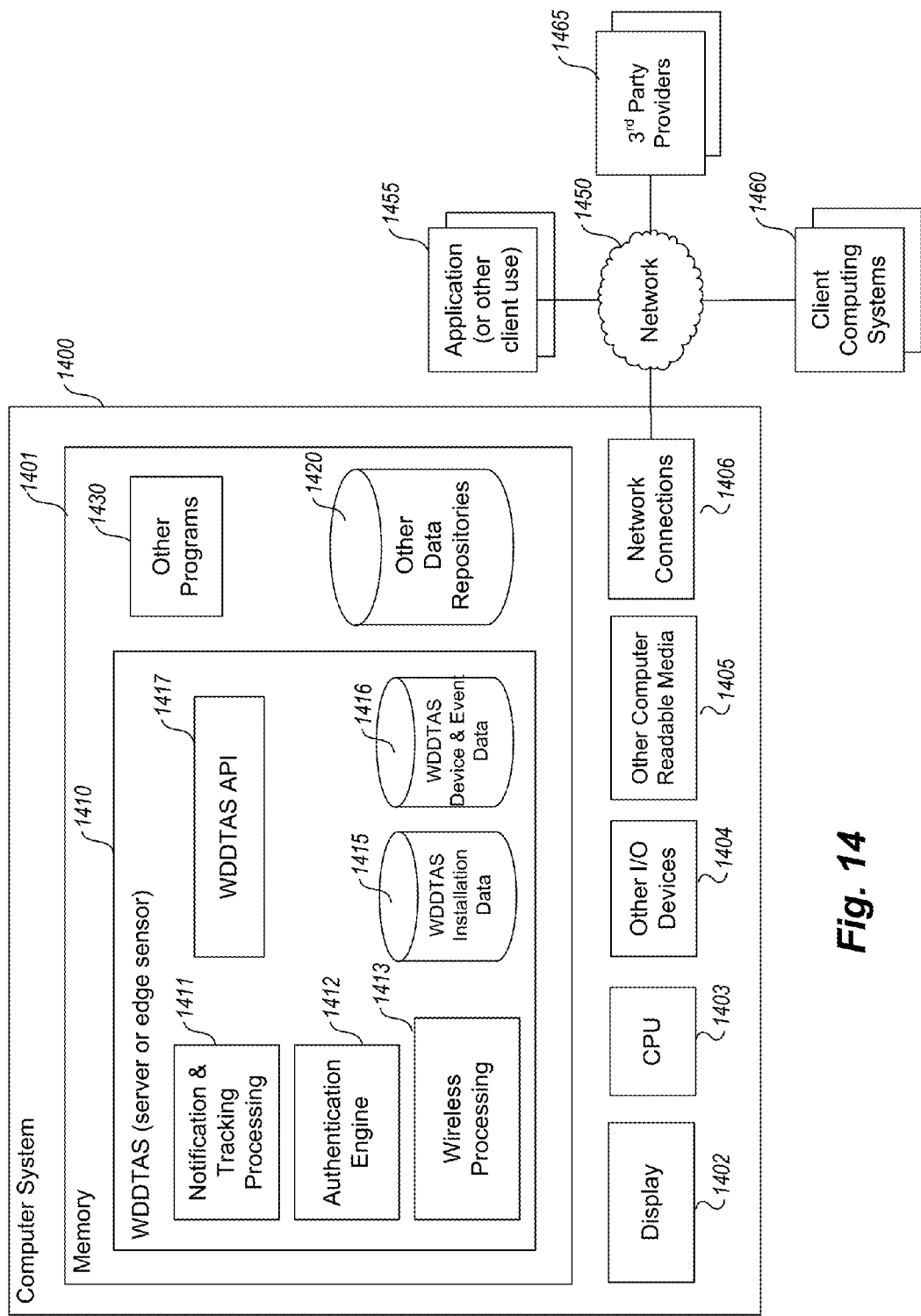
FIG. 14 is an example block diagram of a computing system for practicing embodiments of a Wireless Device Detection, Tracking, and Authentication System.

Computing Systems for Implementation of WDDTAS Components:

FIG. 14 is an example block diagram of a computing system for practicing embodiments of a Wireless Device Detection, Tracking, and Authentication System. Of note, the computing system shown in FIG. 14 may be used to practice embodiments of a WDDTAS server and/or edge sensor described herein. Note as well that one or more general purpose virtual or physical computing systems suitably instructed or a special purpose computing system may be used to implement an WDDTAS server/edge sensor. Further, the WDDTAS may be implemented in software, hardware, firmware, or in some combination to achieve the capabilities described herein.

Note that one or more general purpose or special purpose computing systems/devices may be used to implement the described techniques. However, just because it is possible to implement the WDDTAS server/edge sensor on a general purpose computing system does not mean that the techniques themselves or the operations required to implement the techniques are conventional or well known.

The computing system 1400 may comprise one or more server and/or client computing systems and may span distributed locations. In addition, each block shown may represent one or more such blocks as appropriate to a specific embodiment or may be combined with other blocks. Moreover, the various blocks of the WDDTAS server/edge sensor 1410 may physically reside on one or more machines, which use standard (e.g., TCP/IP) or proprietary interprocess communication mechanisms to communicate with each other.

In the embodiment shown, computer system 1400 comprises a computer memory ("memory") 1401, a display 1402, one or more Central Processing Units ("CPU") 1403, Input/Output devices 1404 (e.g., keyboard, mouse, CRT or LCD display, etc.), other computer-readable media 1405, and one or more network connections 1406. The WDDTAS 1410 is shown residing in memory 1401. In other embodiments, some portion of the contents, some of, or all of the components of the WDDTAS 1410 may be stored on and/or transmitted over the other computer-readable media 1405. The components of the WDDTAS 1410 preferably execute on one or more CPUs 1403 and manage the detection, tracking, authentication of devices, and persistence of device information as described herein. Other code or programs 1430 and potentially other data repositories, such as data repository 1420, also reside in the memory 1401, and preferably execute on one or more CPUs 1403. Of note, one or more of the components in FIG. 14 may not be present in any specific implementation. For example, some embodiments embedded in other software may not provide means for user input or display.

In a typical embodiment of a WDDTAS server for example, the WDDTAS 1410 includes one or more Notification and Tracking Processing engines 1411, one or more authentication engines 1412, and wireless processing (and/or RFID processing, GPS, etc.) 1413. In at least some embodiments, the notification processing 1411 is provided external to the WDDTAS and is available, potentially, over one or more networks 1450. Other and/or different modules may be implemented. In addition, the WDDTAS may interact via a network 1450 with application or client code 1455 that controls administration of a WDDTAS installation, one or more client computing systems 1460 that use the data provided by a WDDTAS installation, and/or one or more third-party information provider systems 1465. Also, of note, the WDDTAS Device and Event data repository 1416 and/or the WDDTAS installation data repository 1415 may be provided external to the WDDTAS as well, for example in a third party database accessible over one or more networks 1450.

In an example embodiment, components/modules of the WDDTAS 1410 are implemented using standard programming techniques. For example, the WDDTAS 1410 may be implemented as a "native" executable running on the CPU 1403, along with one or more static or dynamic libraries. In other embodiments, the WDDTAS 1410 may be implemented as instructions processed by a virtual machine. A range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs. Some embodiments may execute concurrently and asynchronously and communicate using message passing techniques. Equivalent synchronous embodiments are also supported.

In addition, programming interfaces to the data stored as part of the WDDTAS 1410 (e.g., in the data repositories 1415 or 1416) can be available by standard mechanisms such as through C, C++, C#, and Java APIs; libraries for accessing files, databases, or other data repositories; through scripting languages such as XML; or through Web servers, FTP servers, or other types of servers providing access to stored data. The data repositories 1415 and 1415 may be implemented as one or more database systems, file systems, or any other technique for storing such information, or any combination of the above, including implementations using distributed computing techniques.

Also the example WDDTAS 1410 may be implemented in a distributed environment comprising multiple, even heterogeneous, computer systems and networks. Different configurations and locations of programs and data are contemplated for use with techniques of described herein. In addition, the [server and/or client] may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of an WDDTAS.

Furthermore, in some embodiments, some or all of the components of the WDDTAS 1410 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents or instructions to perform at least some of the described techniques. Some or all of the components and/or data structures may be stored on tangible, non-transitory storage mediums. Such computer program products may also take other forms in other embodiments. Accordingly, embodiments of this disclosure may be practiced with other computer system configurations.

Example Use Cases:

1) A customer of the WDDTAS requests to authenticate with a sensor-equipped ATM. The WDDTAS system can determine the identity of the person within proximity of the ATM and can verify with additional factors (to provide secure authentication with multiple authentication factors) that this user is authorized.

2) A WDDTAS installation administrator might decide to use the WDDTAS platform in a physical security operation. It might be used to find lost devices, if those devices happen to have WiFi turned on. It might also be used to detect and grab the signatures of devices, building a profile for each device, in order to retroactively determine which devices, and thus people, have been present in the area.

3) A WDDTAS installation administrator might decide to install their own system for tracking precious inventory. In the case of certain kinds of merchandise, like electronic merchandise (e.g. phones or laptops), the merchandise can have the electronic tag application installed, and thus can be tracked throughout the store. Even though these devices would be detected by the WDDTAS without the application installed, the store owner can install the application on these devices in order to provide cryptographic proof that the item has not been spoofed, and/or forged, by a program that emits similar wireless traffic. If an end user (e.g., the store owner) has this kind of sensor platform in-store, the end user will probably want the system to generate alerts as the merchandise walks out the front door.

4) A store manager might use the WDDTAS installation as a payment system. The installation could provide instantaneous automated purchases for customers who have an electronic tag on their respective devices or are running the WDDTAS application on their wireless devices. This example uses the installation's ability to determine the location of devices within the area as computed from fixed or determined coordinates for each edge sensor. Once the device has been detected near to the target area, and the device has performed an RSA cryptographic handshake with an edge sensor, it will receive a session token that can be used to make purchases or validate the identity of a potential consumer.

5) In certain cases electronic tags can report additional information such as battery status, temperature, magnetic resonance, accelerometer state, and user presence. These tags running the electronic tag software application can share information back to the associated edge sensor, and from the sensor back to the server. WDDTAS administrators could collect the current temperature from each electronic tag in order to form a heatmap from the data returned by the WDDTAS API. This data could then be mined and used for a variety of purposes including for scientific use.

6) Some operators prefer a moving installation, and thus edge sensors can be equipped with the ability to determine their own location with GPS or wireless trilateration in order to provide edge sensor location. Once the system knows the starting points at each edge sensor and the signal distance from those edge sensors, the actual location of a device can be plotted on a map alongside one or many other devices.

7) Enhanced data collection from electronic tags. Fitness bands and devices with similar ability to measure heart rate, skin conductivity, breathing, and footsteps (pedometer) can reveal additional details that are reported to an associated edge sensor. A gym trainer might use a WDDTAS installation so configured to collect this data from many fitness devices at once in order to provide better training. Biofeedback could also be provided.

8) A WDDTAS installation can provide an inventory tracking system that replaces RFIDs and can use any type of electronic tag as a beacon recognized by an edge sensor that is part of the installation.

9) A WDDTAS installation can provide system for tracking doctors and other medical professionals as they move through handling patients so that more accurate time estimates may be delivered to waiting patients and office personnel.

10) More accurate locating and probing of desired targets. Edge sensors can be placed on a drone or vehicle and used to define a virtual and dynamically changing "zone" (dynamic geofencing) surrounding eventual targets.

11) Using dynamic geofencing, a search and rescue type operation or broadcast to find a device in a moving vehicle such as in response to an amber alert can be aided by the dynamic geofencing target zones provided by a WDDTAS installation.

Many other example use cases can take advantage of the passive monitoring, accurate pinpointing of device location, and ability to dynamically define target zones using groups of edge sensors facilitated by a WDDTAS installation.

Additional Topic Areas for Further Claims:

1. A mobile wide-area wireless sensor network that can be deployed on-demand, with sensors that can route payments between one another to reach the payment back-end.

2. A platform that provides wireless and mobile authentication of devices and their users optionally with automated two factor authentication. It can verify the locations of devices and authenticate those devices over WiFi, sending those details back to the server.

3. A selector-based intelligence system for detecting and targeting 802.11 wireless devices in the area of operation by selecting and storing their probe requests and beacons without requiring additional electronic tag software to detect devices.

4. A mobile wireless detection platform that can optionally run on battery operated hardware. This mobile platform provides device detection and other features on-the-go. As such, the system can be mounted to vehicles and unmanned aerial vehicles (drones), and can be controlled by a tablet operator collecting signals.

5. A platform that provides similarity metrics and can identify whether two monitored devices are similar or a likelihood that the two devices have been in previous contact with each other based upon their prior connection histories.

Other claim topic areas are contemplated based upon the above description.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 62/473,172, entitled "WIRELESS DEVICE DETECTION, TRACKING, AND AUTHENTICATION PLATFORM AND METHODS," filed Mar. 17, 2017; which application is incorporated herein by reference in its entirety.

From the foregoing it will be appreciated that, although specific embodiments have been described herein for purposes of illustration, various modifications may be made without deviating from the spirit and scope of the invention. For example, the methods, techniques, and systems for performing device detection, tracking, and authentication discussed herein are applicable to other architectures other than a 802.11 architecture. For example, the methods, techniques and systems also apply (with changes to protocols and data) to Bluetooth architectures. Also, the methods, techniques, and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A wireless device detection and tracking system comprising:
    a plurality of sensor devices that are mobile and dynamically located to form one or more dynamic geographic zones, each sensor device comprising at least one antenna, at least one wireless network interface controller, monitoring code logic and reporting code logic, wherein the monitoring code logic is configured to:
        place the at least one wireless networking interface controller (NIC) into a monitor mode to cause the NIC to monitor wireless network traffic from one or more wireless devices passively without responding to the one or more wireless devices and without initiating or otherwise forming a communication connection to any one of the one or more wireless devices;
        upon receiving a request for a possible connection to a previously connected network from a monitored device of the one or more wireless devices through passive monitoring, extracting data from the request and formulating metadata corresponding to the monitored device; and
    wherein the reporting code logic is configured to relay the extracted data and metadata corresponding to the monitored device;
    a data repository configured to persistently store wireless device data and metadata; and at least one server computing system, communicatively coupled to the plurality of sensor devices and the data repository, and configured to:
 receive the relayed extracted data and metadata corresponding to the monitored device; and
 using trilateration techniques, determine a location of the monitored device.

2. The system of claim 1 wherein the request for the possible connection to a previously connected network from a monitored device is an 802.11 Probe Request delivered as a 802.11 Management Frame.

3. The system of claim 1 wherein the wireless network traffic is monitored passively using Bluetooth protocol.

4. The system of claim 1 wherein the location of the monitored device is determined in substantially near real time by the at least one server computing system to obtain a location of the monitored device that is perceived to be current.

5. The system of claim 1 wherein the formulated metadata is used to generate a profile of the monitored device.

6. The system of claim 5 wherein the generated profile of the monitored device is compared to profiles of other devices to determine additional characteristics regarding the monitored device.

7. The system of claim 5 wherein the monitoring code logic is configured to receive a request for a possible connection to a previously connected network from a second monitored device of the one or more wireless devices, and wherein the generated profile of the monitored device is used to determine a probability or likelihood that the second monitored device has been in contact with the monitored device when the received requests of both the second monitored device and the monitored device indicate previous communications with at least one network in common.

8. The system of claim 1 wherein at least one of the plurality of sensor devices comprises a second wireless networking interface controller and wherein the at least one of the plurality of sensor devices is configured to control the at least one wireless networking interface controller using the monitoring code logic and is configured to control the second wireless network interface controller using the reporting code logic.

9. The system of claim 1 wherein the trilateration operates by computing distances of the monitored device from two or more of the plurality of sensor devices without using a GPS and without using GSM cellular network towers.

10. The system of claim 1, the at least one server system further configured to:
 determine whether the location of the monitored device is within one of the one or more dynamic geographic zones; and
 when it is determined that the location of the monitored device is within the one of the dynamic geographic zones, cause a notification or an alert.

11. The system of claim 1, the at least one server system further configured to:
 determine whether the location of the monitored device is within one of the one or more dynamic geographic zones; and
 when it is determined that the location of the monitored device is within the one of the dynamic geographic zones, causing a transaction or payment processing to take place.

12. The system of claim 1, the at least one server system further configured to:
 determine an identification of the monitored device; and
 based upon the determined identification and the determined location of the monitored device triggering an alert notification.

13. The system of claim 1 wherein the formulated metadata is a history of wireless networks the monitored device has previously connected to.

14. The system of claim 13, the at least one server computing system further configured to identify the monitored device based upon the history of wireless networks of the monitored device.

15. The system of claim 1, the at least one server computing system further configured to determine the identity of the monitored device using the MAC address of the monitored device and the formulated metadata.

16. The system of claim 1 where the monitored device of the one or more wireless devices is a mobile device.

17. The system of claim 1 wherein at least one of the plurality of sensor devices is a mobile device that executes a wireless device detection and track system application.

18. A method for wireless device detection and tracking comprising:
 under control of one or more sensor devices that are mobile and dynamically located to form one or more dynamic geographic zones, passively monitoring one or more wireless devices without forming a communication connection to any one of the one or more wireless devices;
 upon receiving a request for a possible connection to a previously connected network from a monitored device of the one or more wireless devices, extracting data from the request and formulating metadata corresponding to the monitored device;
 populating a data structure corresponding to the monitored device with the extracted data and the formulated metadata corresponding to the monitored device; and
 forwarding the contents of the data structure to one or more servers that are configured to use trilateration techniques to determine a location of the monitored device.

19. The method of claim 18 wherein the passively monitoring one or more wireless devices is performed without responding to the one or more wireless devices.

20. The method of claim 18, further comprising:
 causing computation of a similarity metric of the monitored device to one or more other devices of the one or more wireless devices.

21. The method of claim 20 wherein the similarity metric is based upon a history of wireless connections that are associated with the monitored device.

22. The method of claim 21 wherein the history of wireless connections that are associated with the monitored device is discoverable by tracking multiple requests from the monitored device.

23. A non-transitory computer-readable medium containing instructions for controlling a computer processor to detect and track wireless devices by performing a method comprising:
 under control of one or more sensor devices that are mobile and dynamically located to form one or more dynamic geographic zones, passively monitoring one or more wireless devices without forming a communication connection to any one of the one or more wireless devices;
 upon receiving a request for a possible connection to a previously connected network from a monitored device of the one or more wireless devices, extracting data from the request and formulating metadata corresponding to the monitored device;

populating a data structure corresponding to the monitored device with the extracted data and the formulated metadata corresponding to the monitored device; and forwarding the contents of the data structure to one or more servers that are configured to use trilateration techniques to determine a location of the monitored device.

24. The non-transitory computer-readable medium of claim 23 wherein the passively monitoring one or more wireless devices is performed without responding to the one or more wireless devices.

25. The non-transitory computer-readable medium of claim 23 wherein the method further comprises:

when it is determined that the location of the monitored device is within the one of the dynamic geographic zones facilitating a payment or a transaction.

26. A non-transitory computer-readable medium containing instructions for controlling a computer processor to detect and track wireless devices by performing a method comprising:

receiving data relayed from a plurality of sensor devices that are mobile and dynamically located to form one or more dynamic geographic zones, the relayed data containing data and metadata extracted and/or formulated from a request for a possible connection from a monitored wireless device passively monitored by at least one of the plurality of sensor devices;

using trilateration techniques, determining a location of the monitored wireless device; and based upon determining whether the determined location of the monitored wireless device is within one of the one or more dynamic geographic zones, triggering a notification and/or an alert, or facilitating a transaction.

27. The non-transitory computer-readable medium of claim 26 wherein the monitored wireless device is monitored passively without any of the plurality of sensor devices forming a communication connection to the monitored wireless device.

28. The non-transitory computer-readable medium of claim 26, wherein the method further comprises:

based upon determining whether the determined location of the monitored wireless device is within one of the one or more dynamic geographic zones, authenticating the user of the device using a secondary authentication factor that is at least one of a pin code, password, fingerprint, and/or biometric measurement.

29. The non-transitory computer-readable medium of claim 26, wherein the method further comprises:

identifying the monitored wireless device using one or more of: a MAC address, hostname, time of detection, vendor, and status.

* * * * *

UNITED STATES PATENT AND TRADEMARK OFFICE
CERTIFICATE OF CORRECTION

PATENT NO. : 9,900,742 B1  
APPLICATION NO. : 15/599436  
DATED : February 20, 2018  
INVENTOR(S) : Lucas Thoresen and Joshua Cohen Page 1 of 1

It is certified that error appears in the above-identified patent and that said Letters Patent is hereby corrected as shown below:

In the Claims

Column 26, Line 13, Claim 15, delete "the MAC address" and insert --a MAC address--.
Column 27, Line 17, Claim 25, delete "within the one of the" and insert --within one of the--.

Signed and Sealed this
Seventh Day of August, 2018

Andrei Iancu
*Director of the United States Patent and Trademark Office*